United States Patent
Ganesan et al.

(10) Patent No.: US 7,120,623 B2
(45) Date of Patent: Oct. 10, 2006

(54) OPTIMIZING MULTI-PREDICATE SELECTIONS ON A RELATION USING INDEXES

(75) Inventors: Prasana Ganesan, Menlo Park, CA (US); Surajit Chaudhuri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 553 days.

(21) Appl. No.: 10/230,292

(22) Filed: Aug. 29, 2002

(65) Prior Publication Data

US 2004/0044662 A1 Mar. 4, 2004

(51) Int. Cl.
*G06F 17/30* (2006.01)
(52) U.S. Cl. .................. 707/2; 707/4; 707/1; 707/5
(58) Field of Classification Search .............. 707/5, 707/3, 4, 6, 2
See application file for complete search history.

(56) References Cited

U.S. PATENT DOCUMENTS

| | | | |
|---|---|---|---|
| 6,629,095 B1 * | 9/2003 | Wagstaff et al. ............... | 707/5 |
| 6,665,664 B1 * | 12/2003 | Paulley et al. ................. | 707/4 |
| 6,804,669 B1 * | 10/2004 | Aggarwal ...................... | 707/6 |

OTHER PUBLICATIONS

R.K. Brayton. Factoring Logic Functions. IBM Journal of Research and Development, vol. 31, No. 2, pp. 187-198, Mar. 1987.

R.K. Brayton, R. Rudell, A. Sangiovanni-Vincentelli and A. Wang. MIS: A Multiple-Level Logic Optimization System. IEEE Transactions on CAD, vol. CAD-6, No. 6, Nov. 1987, pp. 1062-1081.

Sophie Cluet and Claude Delobel. A General Framework for the Optimization of Object-Oriented Queries. Proceedings of the ACM SIGMOD International Conference on Management of Data, San Diego, CA, pp. 383-392, 1992.

Surajit Chaudhuri and Luis Gravano. Optimizing Queries Over Multimedia Repositories. Proceedings of the 1996 ACM SIGMOD International Conference on Management of Data, Montreal, Quebec, Canada, pp. 91-102, 1996.

Surajit Chaudhuri and Kyuseok Shim. Optimization of Queries with User-Defined Predicates. In VLDB '96, Proceedings of $22^{nd}$ International Conference on Very Large Data Bases, Sep. 3-6, 1996, Mumbai (Bombay), India, pp. 87-98, 1996.

Umeshwar Dayal. Of Nests and Trees: A Unified Approach to Processing Queries that Contain Nested Subqueries, Aggregates, and Quantifiers. Proceedings of $13^{th}$ International Conference on Very Large Data Bases, Brighton, England, pp. 197-208, 1987.

Joseph M. Hellerstein and Michael Stonebraker. Predicate Migration: Optimizing Queries with Expensive Predicates. In SIGMOD Conference, pp. 267-276, 1993.

(Continued)

*Primary Examiner*—Frantz Coby
*Assistant Examiner*—CamLinh Nguyen
(74) *Attorney, Agent, or Firm*—Microsoft Corporation

(57) ABSTRACT

Methods of optimizing access to a relation queried through a number of predicates. The methods identify one or more candidate predicates of the selection condition that can be used to factorize the selection condition. A gain from using one or more of the candidate predicates to factorize the selection condition is computed. One or more of the candidate predicates that result in a positive gain are factored from the selection condition to produce a rewritten selection condition. The candidate predicates can be predicates that appear exactly in the selection condition more than once and/or merged predicates that may be predicates in the selection condition that overlap.

75 Claims, 11 Drawing Sheets

OTHER PUBLICATIONS

Alfons Kemper, Guido Moerkotte and Michael Steinbrunn. Optimizing Boolean Expressions in Object-Bases. In Proceedings of the VLDB Conference, pp. 79-90, Vancouver, Canada, Aug. 1992.

M.C. Golumbic and A. Mintz. Factoring Logic Functions Using Graph Partitioning. In Proc. IEEE/ACM International Conference on Computer-Aided Design, (ICCAD-99), San Jose, CA pp. 195-198, 1999.

M. Muralikrishna and David J. DeWitt. Optimization of Multiple-Relation Multiple-Disjunct Queries. In Proceedings of the Seventh ACM SIGACT-SIGMOD-SIGART Symposium on Principles of Database Systems, Austin, TX pp. 263-275, 1988.

C. Mohan, D. Haderle, Y. Wang and J. Cheng. Single Table Access Using Multiple Indexes: Optimization, Execution and Concurrency Control Techniques. In Proceedings International Conference on Extending Database Technology, pp. 29-43, 1990.

R. Brayton, G. Hachtel and A.L. Sangiovanni-Vincentelli. Multilevel Logic Synthesis. Proceedings of the IEEE, vol. 78, No. 2, pp. 264-300, Feb. 1990.

Lewis T. Reinwald and Richard M. Soland. Conversion of Limited-Entry Decision Tables to Optimal Computer Programs: Minimum Average Processing Time. JACM, vol. 13, No. 3, pp. 339-358, Jul. 1966.

Patricia G. Selinger, Morton M. Astrahan, Donald D. Chamberlin, Raymond A. Lorie and Thomas G. Price. Access Path Selection in a Relational Database Management System. In Proceedings of the ACM SIGMOD International Conference on Management of Data, Boston, MA, pp. 23-34, 1979.

Guido Moerkotte, Wolfgang Scheufele. Efficient Dynamic Programming Algorithms for Ordering Expensive Joins and Selections. In Proceedings of the $6^{th}$ International Conference on Extending Database Technology (EDBT), Valencia, Spain, pp. 201-215, 1998.

* cited by examiner

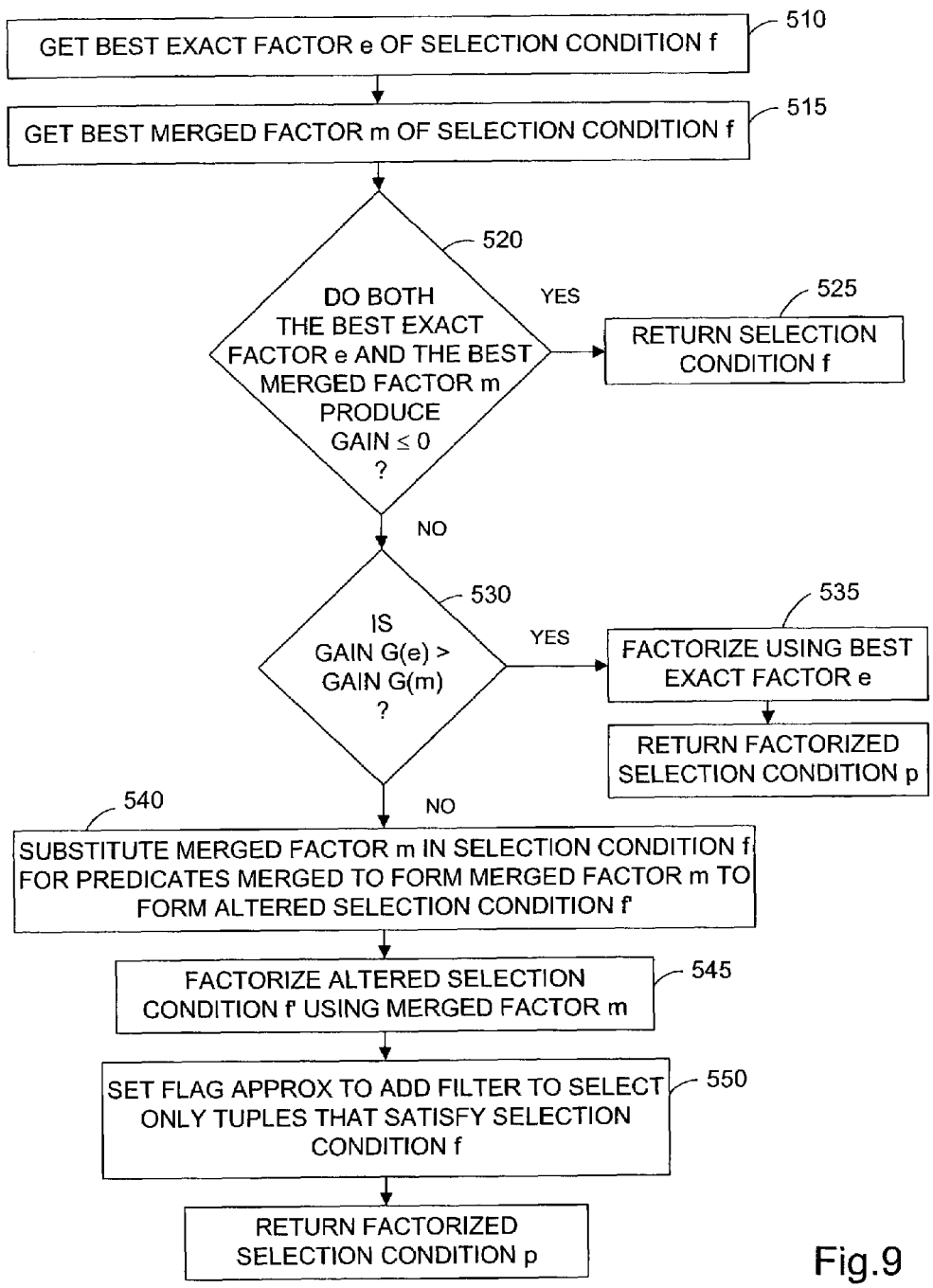

OPTIMIZING MULTI-PREDICATE SELECTIONS ON A RELATION USING INDEXES

TECHNICAL FIELD

This disclosure generally concerns the field of databases. This disclosure relates more specifically to methods of optimizing multi-index access to a relation through a number of predicates.

BACKGROUND OF THE INVENTION

Modern relational database systems continue to process increasingly complex queries. Several reasons contribute to this trend. Queries submitted to relational database systems are increasingly being generated by applications. These queries tend to be more redundant and complex than human-typed queries. Additionally, a recent focus on extending relational database management systems (DBMS) with advanced functionality, like data warehousing and data mining, places a demand for fast execution of queries with complicated predicates.

A straightforward way to evaluate a complex expression is to use a sequential scan on the table and evaluate the condition as a filter. When the selectivity of some of the predicates is small, a cheaper alternative is to use one or more indexes and combine their record identifiers (RIDs) using index-intersection and union (IIU) operators before fetching the data pages from disk. Thus, for example a condition of the form X AND Y (written as XY) can be evaluated by generating record identifier lists for each of X and Y and then intersecting the two lists. Similarly, a condition X OR Y (written as X+Y) can be evaluated by using the union of the two record identifier lists for X and Y. In general, any multi-predicate selection condition can be evaluated by a series of index intersections and unions (IIU), which eventually leave a list of record identifiers to be fetched from the data table.

There are many possible intersection and union (IIU) plans for a given selection query. For example, a condition $C_1$ may have the form (A+B)(A+C). The evaluation of $C_1$ requires an index access for each of the literals, two index-union operations (for generating record identifiers for A+B and A+C), followed by one intersection operation for merging the record identifiers corresponding to A+B and A+C. An equivalent condition $C_2$ has the form A+BC. The corresponding index-based plan for condition $C_2$ requires one less index access (only access A once), and one less index-union operation.

The preceding paragraph is a straightforward example of how a query plan can be improved if it is slightly restructured. However, the general problem of identifying better plans for an arbitrarily complex boolean expression is not easy. The following example shows that disjunctive normal form (DNF) does not guarantee the best plan. Consider another condition $C_3$: AB+AC in disjunctive normal form. An equivalent conjunctive normal form (CNF) is $C_4$: A(B+C). It is not immediately obvious as to which of $C_3$ and $C_4$ would be better. $C_4$ may be better in several cases since it saves on an index access for A and performs one less index intersection. However, $C_3$ could be better than $C_4$ if the intermediate record identification (RID) size of B+C is considerably larger than that of A. This example establishes that neither of the standard normal forms, CNF and DNF, provide an optimal solution for all queries. The relative merits of different index intersection and union (IIU) plans depend on the selectivities of the different predicates, and the costs of accessing different indexes.

Existing query optimizers approach this problem in three ways. The first approach is to use a sequential scan followed by a filtered evaluation of the condition, particularly when the selection condition is very large and contains several disjuncts and conjuncts. The second approach is to generate an index intersection and union plan directly from the form in which the condition is represented in the query without searching the space of index intersection and union plans for the best plan. The third approach is to rewrite the query in conjunctive normal form or in the disjunct form, neither of which is optimal in all cases.

Minimizing boolean expressions through factorization is a problem in several areas of computer science. In compiler optimization it is useful for generating optimal programs for evaluating boolean expressions, in object-oriented databases for ad hoc evaluation of queries with boolean predicates, in relational database systems for factoring join relations on disjuncts and in VLSI circuit design for reducing floor area of circuits. Of these, the boolean minimization problem has been studied most extensively in the VLSI literature.

Factoring boolean formiae to minimize the total number of literals is an important problem in VLSI design because the area taken up by a circuit for a boolean formula is roughly proportional to the number of literals in the formula. This problem is NP-hard and computing the optimal solution is computationally infeasible even for relatively small functions. However, the practical relevance of the logic minimization problem in VLSI has led to the design of several algorithms with various levels of complexity. These approaches can be grouped into three categories—algebraic, boolean and graph-theoretic. None of these approaches offer any guarantees about the quality of the factorization. Of the three classes of factoring methods, algebraic factoring is the most popular since it provides very good results while being extremely fast. Query optimization is different from the VLSI logic minimization, because every literal a boolean formula that represents a query is associated with a different fixed cost that depends on the literal's selectivity and index. Also, unlike the problem of VLSI logic minimization, the size of intermediate results is also important for query optimization since it affects index-intersection and index-union cost.

Early relational database management systems rewrote query expressions as a conjunctive normal form expressions and exploited only one index per expression. Others rewrote the expressions as a disjunctive normal form expression and union-ed each disjunct evaluated independently. These simple approaches were augmented in later systems to exploit multiple indexes by evaluating them as arbitrary index intersection and union plans. These approaches attempted to choose the best subset of eligible indexes and sequence the record identifier mergings for best performance. However, these approaches operate on the condition as directly expressed in the query and do not explore the space of alternative rewrites.

Techniques for optimization of user-defined predicates with varying costs of evaluation and selectivity have been developed. These techniques attempt to reduce the number of invocations of the user-defined predicates while leveraging its selectivity. These techniques are for non-indexed access and CPU cost minimization. These techniques either concentrate on ANDs alone, are not applicable for indexed access or do not attempt to factorize common predicates across them. In these techniques, the focus is on reducing the number of invocations of the expensive functions.

There is a need for a method that identifies an optimized index intersection and union-based plan for a query, by searching the space of several possible rewrites of the boolean expression. The expression is rewritten using exact and/or relaxed factors to improve the cost of indexed access to a relation.

SUMMARY

The present application concerns a method of optimizing processing of a query with a record selection condition that includes a number of predicates. In the method one or more candidate predicates of the selection condition are identified that can be used to factorize the selection condition. A gain from using a candidate predicate to factorize the selection condition is computed. The candidate predicate that results in a gain, preferably the greatest gain, is factorized from the selection condition to produce a rewritten selection condition. The same process may then be applied to the quotient and remainder of the factorization to further rewrite the selection condition. The query is processed with the rewritten selection condition.

Two approaches that may be used to select predicates for factorization are a greedy approach and dynamic programming approach. In the greedy approach, the candidate predicate that will result in the greatest gain is first factorized from the selection condition. In the dynamic programming approach, candidate predicates are chosen for multiple subsets of disjuncts of the selection condition. First, every pair of disjuncts are compared to identify common factors, if any. For every such pair of disjuncts, the gain from performing the factorization is computed. The process is then repeated for every possible set of three disjuncts, every possible set of four disjuncts, and so on, until the set of disjuncts is the entire selection condition. Computing the gain for such multiple sets of disjuncts can be done efficiently by using the computed gains of smaller subsets of these multiple sets.

In various embodiments of the application, the candidate predicates are predicates that act on an indexed attribute. The gain computed is the cost savings obtained by reducing a number of index accesses for the candidate predicate, added to the cost savings from reducing the number of index intersections as a result of factorizing the candidate predicate, reduced by the cost increase from increased index-union costs that result from factorizing the candidate predicate. The gain is computed for all predicates that are literal divisors of the selection condition and the predicate that produces the largest gain is identified. The method is recursively applied to a rewritten selection condition. The candidate predicates are exact factors and/or merged predicates of the selection condition. When a merged predicate is used to factorize the selection condition, the results obtained from evaluating the rewritten selection condition that do not satisfy the original selection condition are filtered out.

In one embodiment, a method for merging predicates that may be used to factorize the selection condition is used to produce merged predicates. In this embodiment, a set of predicates on a given attribute is identified. Predicates with an overlapping range on a given attribute are identified. Merged predicates are produced by the union of overlapping predicates in the set. The merged predicates that produce a greater gain than the overlapping predicates used to form the merged predicates are identified. The identified merged predicates are added to the set of predicates and the overlapping predicates used to form identified merged predicates are deleted from the set. The predicate in the set that produces the greatest gain is selected. The selected predicate is used to factorize the selection condition.

In one embodiment, exact factor predicates and merged factor predicates are evaluated to identify a factor that results in the greatest gain. In this embodiment, exact factor predicates that are an exact factor of the selection condition and produce a gain when used to factorize the selection condition are identified. Similarly, merged predicates produced by the union of overlapping predicates of the selection condition that produce a gain when used to factorize the selection condition are identified. The method then determines whether an exact factor predicate or a merged predicate produces a greater gain when used to factorize the selection condition. When an exact factor predicate produces the greatest gain, the exact factor is factorized from the selection condition to produce a rewritten selection condition. When a merged predicate produces the greatest gain, the merged predicate is factorized from the selection condition to produce a rewritten selection condition. The query is processed with the rewritten selection condition.

In one embodiment, the disclosed methods are adapted to perform factorization efficiently even when the original expression is not in Disjunctive Normal Form(DNF). Since it might prove expensive to convert an expression to DNF before performing factorization, methods are disclosed that can perform factorization on arbitrarily nested AND-OR trees. The algorithms may be adapted to produce plans that may be necessary because of constraints faced by the optimizer. The disclosed process identifies the best single-index plan for accessing data in a table, the best index-intersection-based plan, and the best plan that involves a series of index intersections followed by a series of index unions, interspersed with data lookups. In one embodiment, the process produces a plan based on arbitrary sequences of index intersections, index unions and data lookup.

BRIEF DESCRIPTION OF THE DRAWINGS

The present invention is illustrated by way of example and not limitation in the figures of the accompanying drawings, in which:

FIG. 9 a flowchart representation of method steps used to practice an embodiment of the present invention.

DETAILED DESCRIPTION

Exemplary Operating Environment

Figure 1:
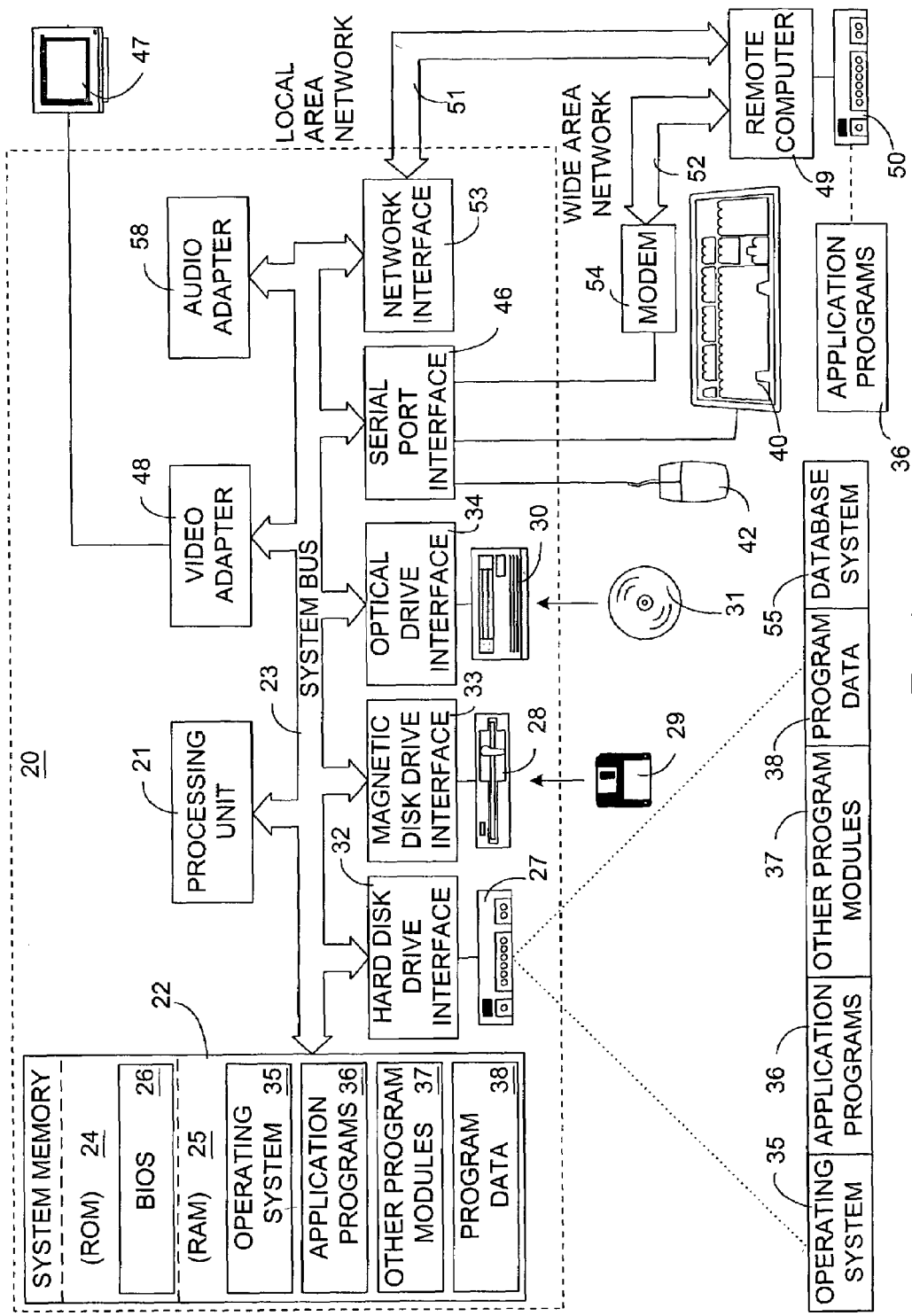
FIG. 1 illustrates an exemplary operating environment for a system for evaluating database queries.

FIG. 1 and the following discussion are intended to provide a brief, general description of a suitable computing environment in which the disclosed methods may be implemented. Although not required, the disclosed methods will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the disclosed methods includes a general purpose computing device in the form of a conventional personal computer 20, including a processing unit 21, a system memory 22, and a system bus 24 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disk drive 30 for reading from or writing to a removable optical disk 31 such as a CD ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk, magnetic disk 129, optical disk 31, ROM 24 or RAM 25, including an operating system 35, one or more application programs 36, other program modules 37, and program data 38. A database system 55 may also be stored on the hard disk, magnetic disk 29, optical disk 31, ROM 24 or RAM 25. A user may enter commands and information into personal computer 20 through input devices such as a keyboard 40 and pointing device 42. Other input devices may include a microphone, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include local area network (LAN) 51 and a wide area network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over wide area network 52, such as the Internet. Modem 54, which may be internal or external, is connected to system bus 23 via serial port interface 46. In a networked environment, program modules depicted relative to personal computer 20, or portions thereof, may be stored in remote memory storage device 50. It will be appreciated that the network connections shown are exemplary and other means of establishing a communications link between the computers may be used.

Database System

Figure 2:
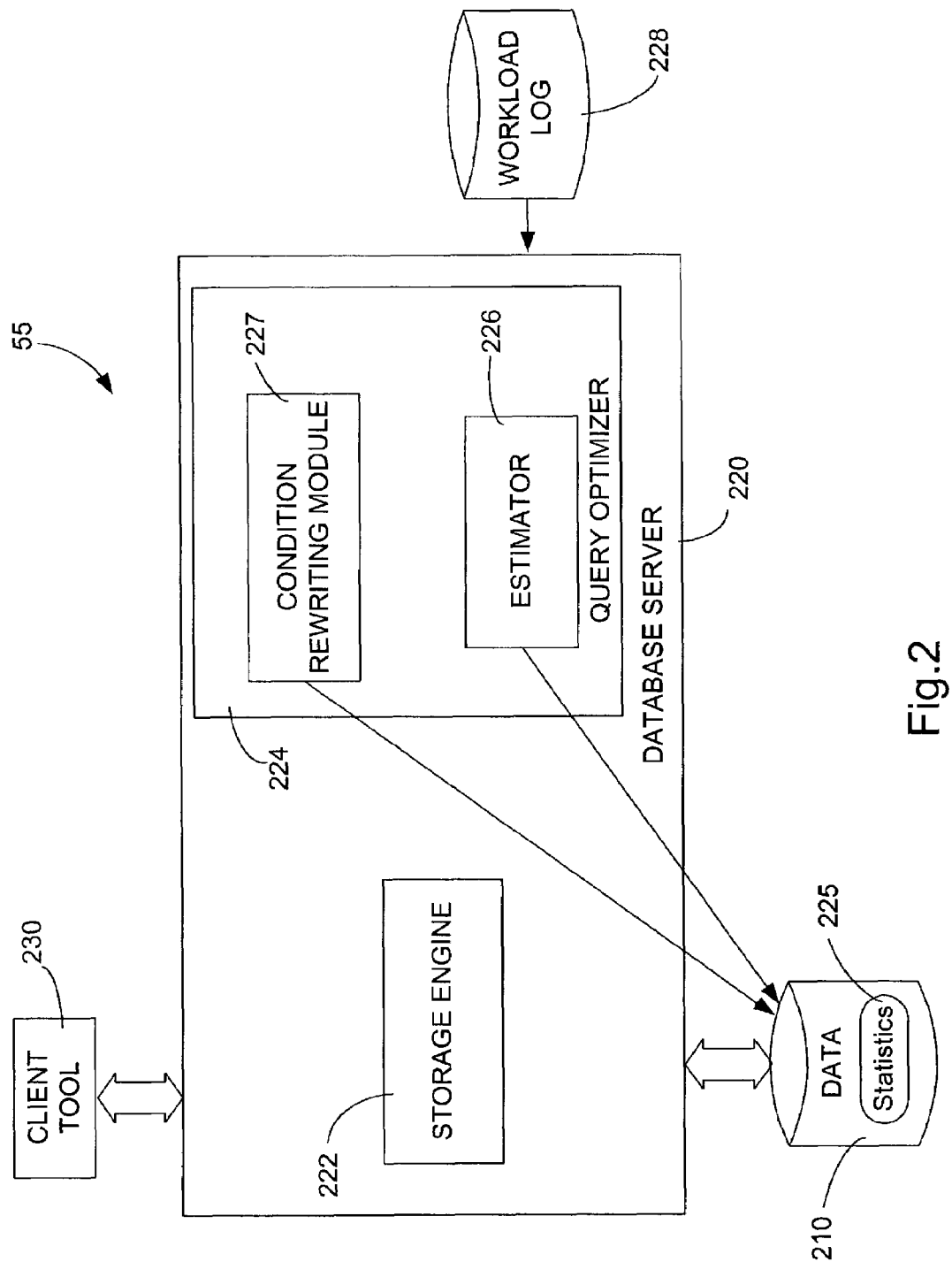
FIG. 2 is a block diagram of a system for evaluating database queries according to an embodiment of the invention.

FIG. 2 illustrates for one embodiment a computer database system 55 comprising a database 210, a database server 220, and a client tool 230. Database system 55 may be resident on the personal computer 20 or may be remotely located from the personal computer (see FIG. 1). The database system 55 manages the storage and retrieval of data in database 210 in accordance with data manipulation statements or queries presented to database system 55 by a database application or by a user, for example.

Database 210 comprises a set of tables of data. Each table comprises a set of records of data stored in one or more data fields. The records of a table are also referred to as rows or tuples, and the data fields of records in a table are also referred to as columns. A data mining model is produced by the computer 120 by executing a stored computer program that implements a data mining engine or component (not shown).

Database server 220 processes queries, for example, to retrieve, insert, delete, and/or modify data in database 210. A typical user query includes a selection of data from the database, for example a simple query may inquire about how many records fall between the values represented by certain endpoints, designated rangehigh and rangelow. Other, more complicated queries may involve joins of numerous attributes, but even more complicated queries may have simple selection queries imbedded within them. Database system 55 may support any suitable query language, such as Structured Query Language (SQL) for example, to define the queries that may be processed by database server 220. Suitable SQL queries include, for example, Select, Insert, Delete, and Update statements. Database server 220 for one embodiment comprises the Microsoft® SQL Server.

Database server 220 comprises a storage engine 222 for accessing data in database 210. The enhance performance in processing queries, database server 220 comprises a query optimizer 224 to generate efficient execution plans for queries. Query optimizer 224 comprises an estimator 226 which accesses statistics 225 about the database and a rewriting module 227 for exploring possible rewritten forms of selection queries and selecting an optimal form of the query. The statistics 225 may be stored in the data stored in the database 210 and loaded into the database when the system is started. The estimator 226 may estimate the selectivities of the operations involved in a user query to determine the order in which these operations should be executed. Query optimizer 224 may maintain or access a workload log 228 which records the series of user queries executed against the system.

Optimization Method

The disclosed method optimizes multi-index access to a relation queried through a large number of predicates. Exploiting multiple indexes to access a table is a well-known optimization technique for queries with multiple predicates. Traditionally, an access plan that is generated is dependent on the exact form of the selection condition in the query. The disclosed methods rewrite selection conditions using common factors to yield better access plans for exploiting the various indexes on the relation. This application discloses an efficient factorization algorithm. In one embodiment, conditions in a conjunct of a complex condition are relaxed to enable better factoring. Algorithms disclosed in this application have been evaluated experimentally to identify the performance improvement for various query characteristics.

This disclosure addresses the problem of optimizing single-relation queries with a complex selection condition involving multiple atomic predicates. While the optimization of queries where complexity is due to a large number of joins has received a lot of attention in the database literature, optimization of complex selection conditions involving multiple AND and OR operations has not been widely addressed. In the exemplary embodiment, this strategy can also be generalized to cases where not all predicates in the selection condition have a corresponding index.

This disclosure discusses exact factoring, condition relaxation, and integrating factoring with index selection to identify an optimized boolean expression of the complex condition.

Overview of Exact Factoring

Complex conditions often contain atomic predicates repeated across many disjuncts. In this application, atomic predicates that are included in two ore more disjuncts are referred to as exact factors. It is more likely that atomic predicates will be repeated across disjuncts when predicates are blindly normalized to a standard disjunctive normal format. Exact factoring exploits such repetition to reduce access cost.

Overview of Condition Relaxation

Often, predicates in a boolean expression might overlap even if they are not quite identical. This application discloses a novel condition-relaxation technique for merging overlapping predicates that are not amenable to normal syntactic factorization. For example, $E_1$: (x IN [1,5])A+(x IN [2,6])B, where (x IN [1,5]) refers to an attribute x being in the range 1 to 5, (x IN [2,6]) refers to attribute x being in the range 2 to 6 and A, B refer to some other logic expressions. We can relax both predicates involving x to (x IN [1,6]) and factor it out to produce $E_2$: (x IN [1,6])(A+B). The factored expression might have considerably lower data-access cost even though it requires an additional filter pass to evaluate the exact expression $E_1$.

Overview of Integrating Factoring with Index Selection

In the exemplary embodiment, the exact and condition relaxation factoring algorithms assume that all atomic predicates with an eligible index will be evaluated via index scan. This may be suboptimal for predicates that are not very selective. Unfortunately, the decision to use an index for a predicate scan is both influenced by, and influences, the factoring decision. In one embodiment, the query optimizer 224 selects a set of indexes for a factorized expression.

The output of query optimization is an index intersection and union plan (IIU plan) that corresponds to a factored form of the original expression, generated by exact and approximate factoring. The IIU plan generates a record identification list which will be used to fetch the data pages on which any remaining part of the expression will be evaluated.

In some instances, it may be possible to evaluate a query without accessing the data pages at all. These are called index-only plans. In one embodiment, Index-Only plans are output if they turn out to be more efficient.

In one embodiment, the disclosed methods are used to contribute to optimization of arbitrary select-project-join queries. Optimizing select-project-join queries involves reordering the joins, choosing a specific join strategy for each of joins, and providing a plan for retrieving tuples satisfying a selection condition from the base tables. The disclosed algorithms can be used in a module that is called by the query optimizer to determine how best to access a base table, given a complex selection condition. For some base relations of a join, the inner relation of a nested-loop-with-index join, optimization of a selection condition may not be necessary. Even so, the information produced would be useful in helping the query optimizer choose between different join strategies.

Exact Factoring

Queries with a complex selection condition C that involves multiple predicates may be ANDed and ORed together. A table R may have indexes on a subset of the attributes that appear in selection condition C. The disclosed methods optimize the access path to the table R using one or more of these indexes. For this optimization, the part of the condition C left after setting to "true" the predicates on non-indexed attributes is evaluated. These non-indexed predicates are evaluated in a filter phase after the data pages are fetched. In one embodiment, all these remaining indexed predicates will be evaluated via index scans.

In one embodiment, different index intersection and union plans are proposed and an optimized index intersection and union plan is determined for a condition C using exact factoring. The different intersection and union plans have a direct correspondence with the representation of the boolean formulas. Therefore, reference to "expressions" and their evaluation cost refers to the evaluation cost of the corresponding index intersection and union plan.

An expression in the form A+BC is generally cheaper to evaluate than the expression (A+B)(A+C) using index intersection and union. Similarly, an expression represented as AB+AC often tends to be evaluated much less efficiently than an expression represented as A(B+C). In general, the "optimal" form of a condition is neither conjunctive normal form nor disjunctive normal form, but an intermediate factored form. This problem is similar to the problem of VLSI logic minimization, where the objective is to find a formula for a given function that uses the fewest number of literals. The problem of optimizing query selection conditions is more complex, since there are different costs associated with each literal due to there different selectivities and retrieval costs. Adding to the complexity of this problem is the fact that there are different costs associated with each literal due to different selectivities and retrieval costs of the literals. In addition, there is an associated index-intersection/union cost with each AND and OR operator in the expression. The "best" expression may not necessarily contain the fewest literals.

Overview of Generic Factoring of Disjunctive Normal Form Expressions

A function f in disjunctive normal form may be factorized. For example, a function f=xyz+wx+wyz is in disjunctive normal form. In this disclosure, each disjunct (e.g. wx) in a disjunctive normal form formula is referred to as a term and each atomic condition like x or y is referred to as a literal.

In one embodiment, the disclosed algorithm assumes that no term of f is directly contained in some other term, thus rendering it redundant. However, a term may be present even if the term happens to be covered by a combination of two or more other terms in this embodiment.

In one disclosed embodiment, f is factorized in the following form:

$$f = D \cdot Q + R$$

such that divisor D and quotient Q do not have any literals in common. This, in combination with other technical conditions, is referred to as algebraic division. The function f=xyz+wx+wyz could be factorized as f=(yz)(x+w)+wx. In the exemplary embodiment, the boolean expression is treated just like an algebraic expression and it is factorized it into a divisor D, quotient Q and remainder R. In the exemplary embodiment, divisor D, quotient Q and remainder R are recursively factorized. In one embodiment, a greedy algorithm is used with no guarantee of optimality. In the exemplary embodiment, hill-climbing approach to selecting the best divisor D at each step ensures a practical solution to this otherwise NP-hard problem. In one embodiment, an existing efficient algorithm for computing Q and R, given f and D is used. One such algorithm is disclosed in R. K. Brayton, Factoring Logic Functions, *IBM Journal of Research and Development*, vol. 31, no. 2, pp. 187–198, (1987). The disclosed method uses heuristics to choose the divisor D.

The divisor D can be chosen from:

1. Any repeated atomic literal, or

2. An expanded space also including expressions on the literals. (Described in Brayton, Factoring Logic Functions and R. K. Brayton et al., A Multiple-Level Logic Optimization System, *IEEE Transactions on CAD/ICAS*, CAD-6, (1987)

In the exemplary embodiment, literal divisors are used both because of efficiency considerations, and because literal divisors provide acceptable results for selection query applications. When an expression includes a conjunction of a number of literals, the selectivity of the conjunction is likely to drop to a very low value by intersecting even three or four literals. Thus, after a few intersections, it may be cheaper to retrieve the actual data rather than to continue performing index intersections. Therefore, being able to effectively factorize to arbitrary depths is not particularly important in a query optimization application, in contrast to logic minimization. Literal-factoring provides speed and optimality for query-optimization applications.

The Cost Model

The disclosed method uses a cost model to choose between various index intersection and union plans. However, in the exemplary embodiment the disclosed factorization algorithms are not tied to the disclosed specific cost model and could be applied just as well with an alternative cost model.

There are two costs associated with an index-intersection and union strategy:

1. Index-Retrieval Cost: This is the cost associated with retrieving the record identifier list that corresponds to a literal. This may require accessing the index pages on disk. This cost is assumed to be proportional to the number of record identifiers retrieved. Thus, a record identifier of length l would cost $k_1 l$ to retrieve via an index, with $k_1$ denoting a constant. In one embodiment, the fixed cost of initializing an index scan is ignored in the cost model.

2. Hash-Merge Cost: Intersecting or unioning two (or more) record identifier lists is normally performed by a hash-merge operation. The cost of this operation is taken to be linear in the total number of record identifiers (RIDs) being intersected or unioned. Index intersection and union may also be performed by a sort-merge operation, which may also be assumed to have a cost linear in the total number of rows involved. Thus, given two record identifier lists of length $l_1$ and $l_2$ the disclosed method will model their merge cost as $l_1+l_2$ in the exemplary embodiment.

In one embodiment, data fetch cost is not included in the cost model, because this embodiment assumes that all indexed predicates are evaluated via the index intersection and union strategy. This assumption ensures that the data access cost is the same for all possible index intersection and union plans. This assumption is removed in the combined factoring, condition relaxation and index selection embodiment described below.

Defining Quality of Literal Divisors

The disclosed method defines the quality of literal divisors to facilitate a choice between two different divisors, and to facilitate determining whether factoring is, in fact, advantageous at all for a given expression.

Consider an expression $ax_1+ax_2+ax_3+ \ldots ax_n$, that may be factored as $a(x_1+x_2+x_3+ \ldots x_n)$. The present disclosure derives an expression that measures the "gain" in performing this factorization, which serves as a measure of the quality of the divisor a. Let $l_x$ denote the number of tuples that satisfy x. For simplicity, assume that the conjunction $ax_i$ is evaluated by intersecting the record identifier lists for $x_i$ and a. This assumption is not always true, but this simplification does not affect the disclosed algorithms and optimality results. In the exemplary embodiment, the implementation uses a cost function that covers the more general case.

The gain from factorization can be approximated by:

$$G = (n-1)(k_1+1)l_a - \left( l_{\sum_{i=1}^n x_i} - \sum_{i=1}^n l_{ax_i} \right) \quad (1)$$

where $l_a$ denotes the reference identification list length of predicate a, $l_{\sum_{i=1}^{n} x_i}$ is the resultant length of the union $x_1+x_2+x_3+\ldots x_n$ and $l_{ax_i}$ is the length of the intersection $ax_i$. In the formula, the first term captures the savings obtained from avoiding repetitive access to the index for a. The second term represents the possible price paid in increased index-union cost, and the benefit of reducing the number of index intersections. In one implementation $l_{\sum_{i=1}^{n} x_i}$ is approximated to $$\sum_{i=1}^{n} l_{x_i}$$

Thus, the gain formula becomes:

$$G = (n-1)(k_1+1)l_a - \sum_{i=1}^{n}(l_{x_i} - l_{ax_i}) \quad (2)$$

The gain formula above is a conservative estimate of the total savings. The factorization algorithm is general and does not depend on the exact cost model disclosed.

Factorization Algorithm

Figure 3:
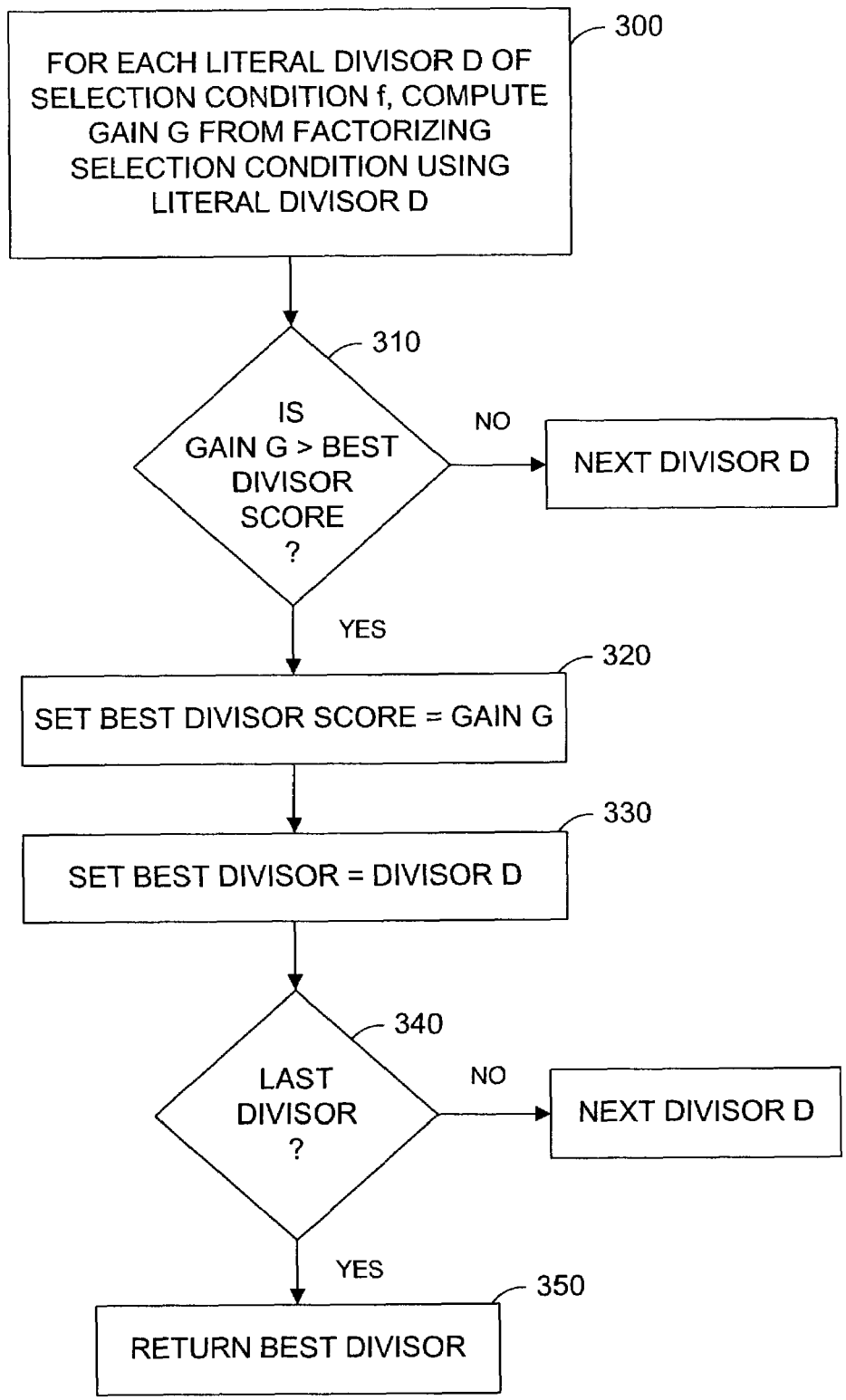
FIG. 3 is a flowchart representation of method steps used to practice an embodiment of the present invention.

Algorithm 1, set out below and illustrated by the flow chart of FIG. 3 is one algorithm that can be used to get the best exact divisor D for a given function f. Algorithm 1 uses a defined gain function to evaluate the quality of a divisor D to return the Best Divisor.

Algorithm 1: GetBestExactDivisor(f)
1: BestDivisor=NULL;
2: BestDivisorScore=0;
3: for all literal divisors D of f do
4: Compute gain G from factorizing f using D;
5: G>BestDivisorScore then
6: BestDivisorScore=G;
7: BestDivisor=D;
8: end if
9: end for
10: return Best Divisor;

Referring to FIG. 3, Algorithm 1 evaluates all literal divisors D of the selection condition f. In one embodiment, only the divisors that are indexed are evaluated. Algorithm 1 computes 300 the gain G from factorizing the selection condition f using each literal divisor D. The algorithm then determines 310 whether the divisor D being evaluated produces a gain G that is greater than the best divisor score of any previously evaluated divisor. If the gain G is less than the best divisor score, the next divisor is evaluated. If the gain G for the divisor D being evaluated is greater than the best divisor score for previously evaluated divisors, algorithm 1 sets 320 the best divisor score to the gain G of the divisor being evaluated and sets 330 Best Divisor to the divisor being evaluated. The algorithm determines 340 whether the divisor being evaluated is the last divisor. If the divisor D being evaluated is the last divisor, the algorithm returns 350 the Best Divisor. If not, the algorithm evaluates the next divisor D.

Algorithm 2, set out below, is an exact factorization algorithm that is simply a greedy approach to factorization using literal divisors D returned by algorithm 1.

Algorithm 2: ExactFactorize(f)
1: BestDivisor=GetBestExactDivisor(f);
2: IF BestDivisor≠NULL then;
3: Factorize f as f=BestDivisor.Q+R
4: return BestDivisor.ExactFactorize(Q)+ExactFactorize(R)
5: end if
6: //There are no useful divisors
7: return f;

Algorithm 2 uses Algorithm 1 to get the best exact factor for a given selection condition f to produce a rewritten selection condition. In the exemplary embodiment, the rewritten selection condition is in the form BestDivisor.Quotient(Q)+Remainder(R). The algorithm uses the Best Divisor returned by algorithm 1 to factorize the selection condition. In one embodiment, the selection condition f is recursively factorized.

In the exemplary embodiment, the space of literals over which the algorithm 1 searches for divisors consists of all literals appearing in at least two disjuncts. Algorithm 2 uses a hill-climbing strategy to arrive at a solution by a sequence of incremental improvements. Algorithm 2 can get stuck at local maxima. This is because the disclosed method uses an algorithm of quadratic complexity on a problem for which computing the optimal solution is infeasible even for relatively small expressions. This is not expected to be a major problem in practice.

Figure 4:
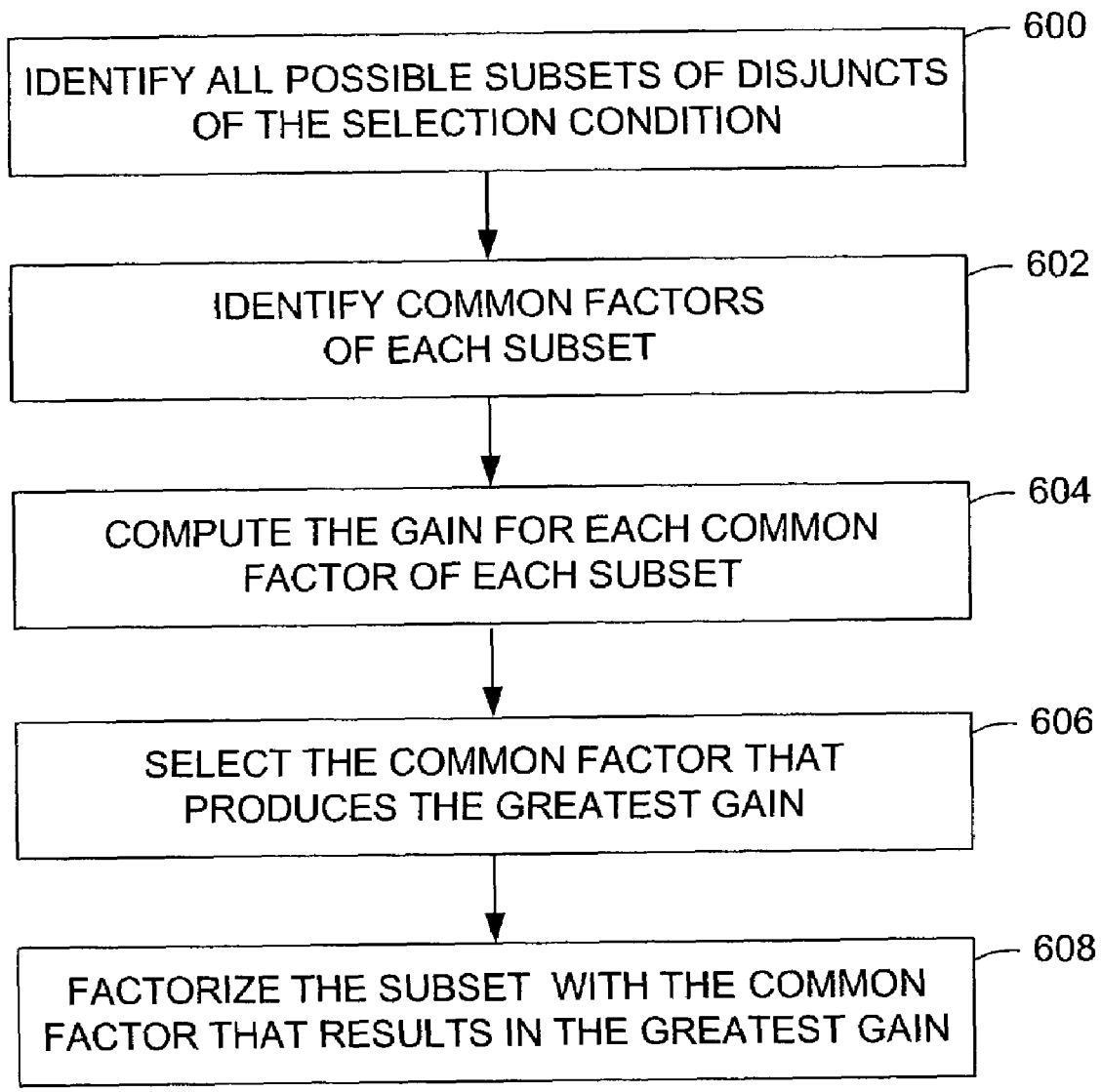
FIG. 4 is a flowchart representation of method steps used to practice an embodiment of the present invention.

Algorithms 1 and 2 may be replaced by or modified to include a dynamic programming strategy that progressively identifies the gain in factorizing from any subset of the disjuncts, by first computing the gain, if any, for pairs of disjuncts, then for triplets of disjuncts, and so on. FIG. 4 is a flowchart that illustrates a dynamic strategy. All possible subsets of disjuncts of the selection condition are identified 600. Common factors are identified 602 for each subset. The gain is computed 604 for each common factor for each subset. The common factor that produces the greatest gain is selected 606. The subset of disjuncts is factorized 608 using this common factor. This strategy is more expensive compared to the greedy approach but could lead to better index-based plans. One optimization that can be used to improve the basic dynamic programming approach, is to avoid computing gain for all sets that don't have a common factor across all their disjuncts. In order to eventually choose the factorization, the method may use a set-cover algorithm to select some of the sets in order to cover all the disjuncts in the original expression.

Figure 5:
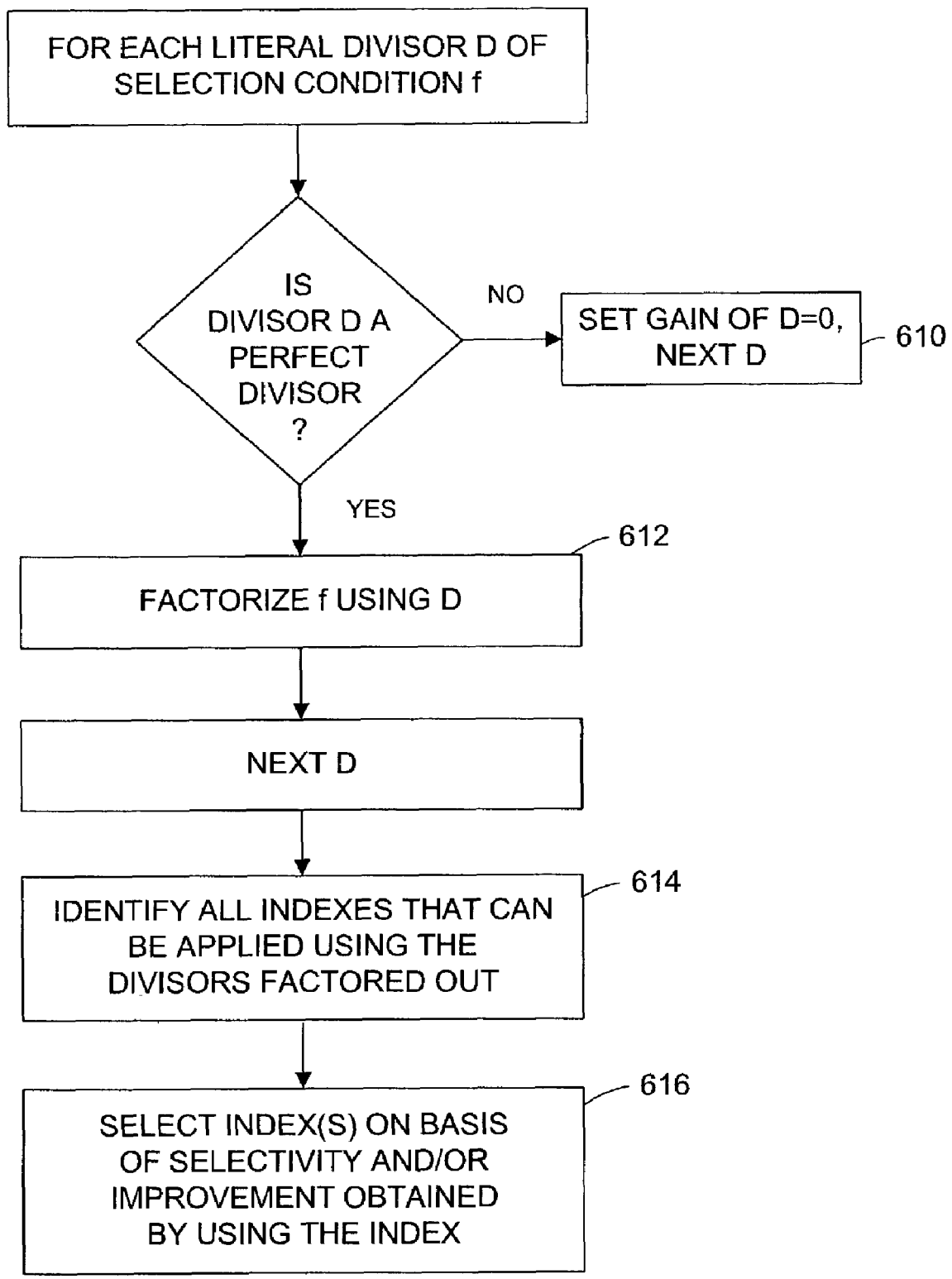
FIG. 5 is a flowchart representation of method steps used to practice an embodiment of the present invention.

Algorithms 1 and 2 may also be extended in order to produce three special kinds of plans: single-index plans, index-intersection plans, and index-intersections-followed-by-unions(IIFU) plans. Referring to FIG. 5, in order to generate single-index and index-intersection plans, the method considers 610 the gain provided by a divisor to be zero unless the divisor is perfect, that is, there is no remainder. If the divisor D is a perfect divisor the selection condition f is factorized 612 using D. Once all perfect divisors have been factored out, the method proceeds through the list of indexes available for the table, identifying

614 all indexes that can be applied using the conditions factored out. The method then chooses 616 one or more of these indexes (intersecting indexes if there is more than one) on the basis of the selectivity offered by the index and the incremental improvement that may be obtained by using the index instead of directly reading the data.

Figure 6:
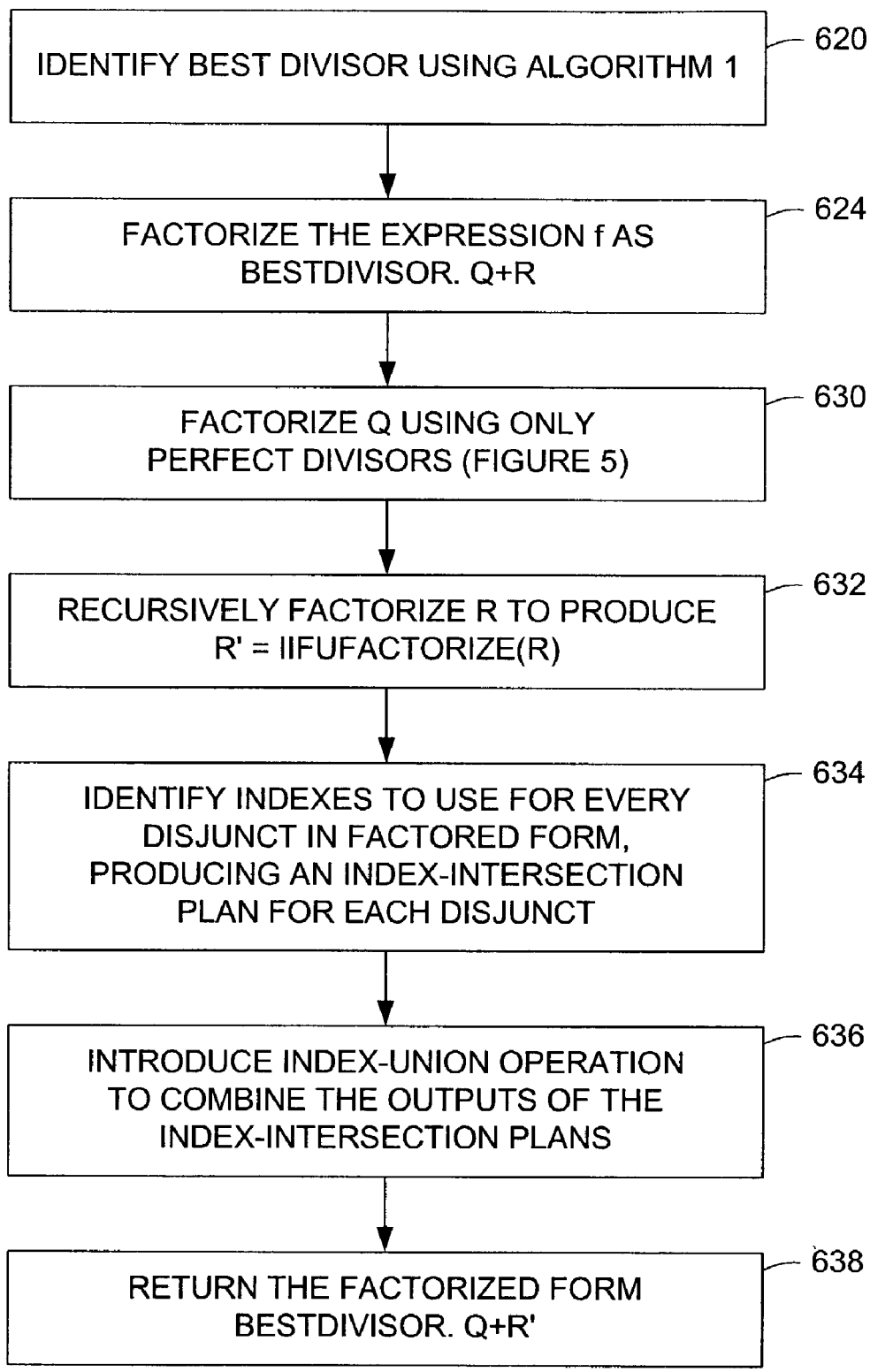
FIG. 6 is a flowchart representation of method steps used to practice an embodiment of the present invention.

In order to produce index-intersections-followed-by-unions(IIFU) plans, the method modifies or uses a simplified version of Algorithms 1 and 2. FIG. 6 illustrates one method that can be used to generate index-intersections-followed-by-unions(IIFU) plans. In this method, the best divisor D is identified 620 by algorithm 1. The selection condition expression is then factorized 624 using the best divisor D. In this embodiment, since the method is not interested in performing index-unions after index-intersections, the method no longer needs to recursively factorize the quotient using non-perfect divisors. Instead, the method identifies and factorizes 630 out all perfect divisors in the quotient. The rest of the quotient may be evaluated through a data lookup. The remainder R is recursively factorized 632 to produce a new remainder R'. Identifying what indexes to use is similar to the case of index-intersections. For every disjunct in the factored form, the method separately identifies 634 the set of indexes to use, treating each disjunct just like the case of index intersections. Using the identified indexes, the method produces 634 an index intersection plan for each disjunct. The method then introduces 636 an index-union operation to combine the outputs of the index-intersection plans. The method then returns 638 the factorized form.

In the exemplary embodiment, the input to the algorithm is the original expression rewritten in the disjunctive normal form. By flattening out all original expressions into disjunctive normal form, the exemplary method exposes the most possible common factors. However, conversion of an arbitrary expression to disjunctive normal form could have an exponential cost in the worst case. Fortunately, this does not turn out to be a major problem. The conversion to disjunctive normal form is expensive only when converting an expression that is nearly in conjunctive normal form, and has very few repeating literals. In such a case, it is likely that the given expression is, itself, very close to being the best possible representation of the condition.

Factorizing Selection Conditions that are not in Disjunctive Normal Format

Figure 7:
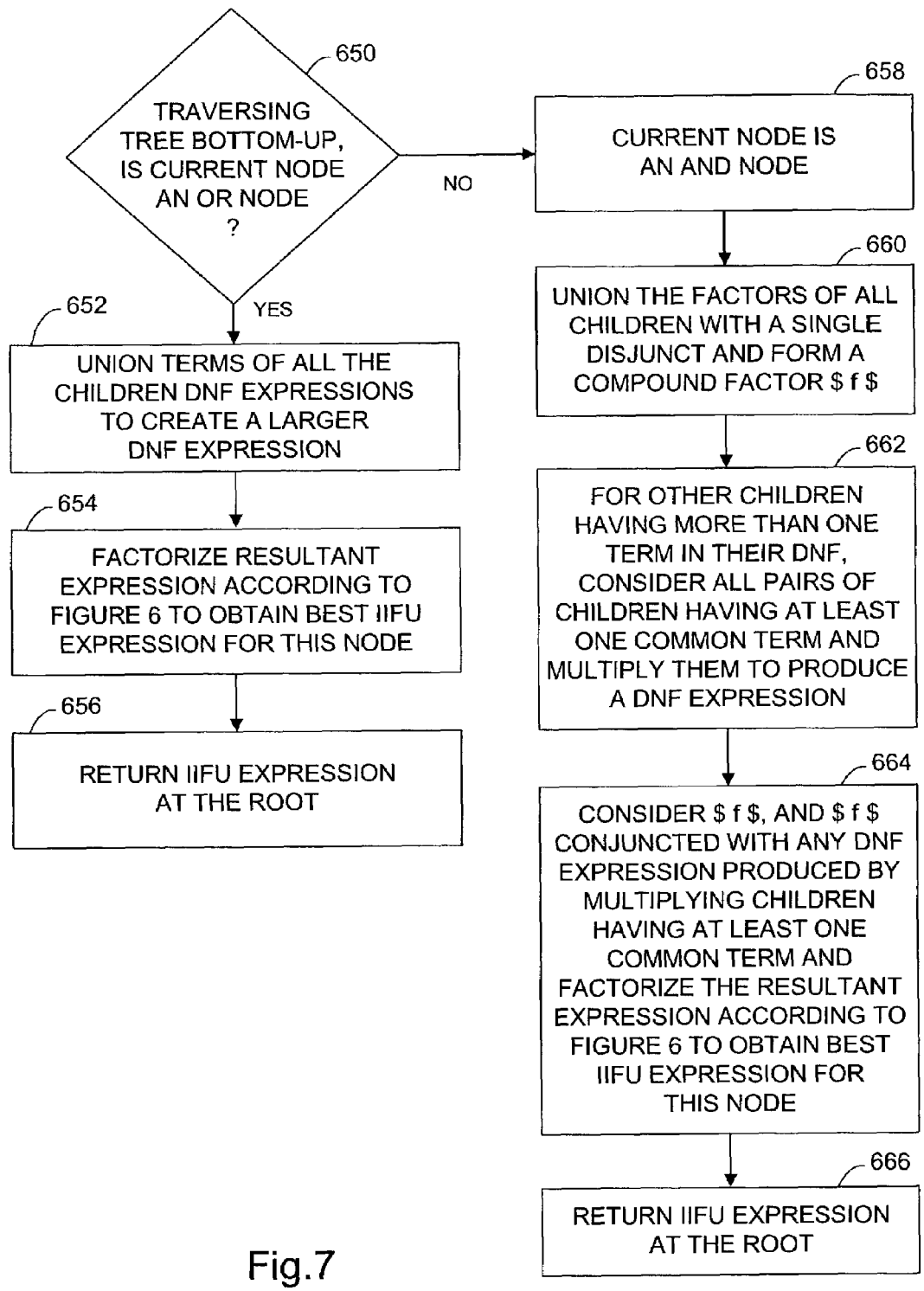
FIG. 7 is a flowchart representation of method steps used to practice an embodiment of the present invention.

In one embodiment, instead of converting to disjunctive normal form and then re-factorizing the condition from scratch, the method could take the given expression as it is, and work bottom-up on the AND-OR tree in order to perform factorization. FIG. 7 illustrates a method for factorizing a selection condition without converting the selection condition to disjunctive normal form. The method illustrated by FIG. 7 factorizes the selection condition and returns an IIFU expression at the root. In the method illustrated by FIG. 7, the method determines 650 whether the current lowest node is an AND node or an OR node. If the current node is an OR node, the method unions 652 the terms of all the children disjunctive normal form expressions to create a larger disjunctive normal form expression. The larger resultant expression is factorized 654 according to the method illustrated by FIG. 6 to obtain the best IIFU expression for this OR node. The IIFU expression is returned at the root. If the current node is an AND node 658, the method unions 660 the factors of all children with a single disjunct to form a compound factor $f$. For other children that have more than one term in their disjunctive normal form, all pairs of children having at least one common term are considered and multiplied 662 to produce a disjunctive normal form expression. The method considers 664 the compound factor $f$ and the compound factor $f$ conjuncted with any disjunctive normal format expression that resulted from step 662 to produce a resultant expression. The method factorizes 664 the resultant expression according to the method illustrated by FIG. 6 to obtain the best IIFU expression for this node. The IIFU expression is returned 666 at the root.

When the lowest node of a selection condition that is not in DNF is an OR node, the method treats the subtree of each of the OR nodes as a separate DNF expression, which may be factorized using Algorithms 1 and 2. If the method seeks only index-intersection plans, the method only needs to consider index-intersection plans for these subtrees. If the method seeks seek IIFU plans, the method will maintain both the set of perfect factors that may be used to develop an index-intersection plan for the subtree, and the factorized form that may lead to an IIFU plan for the subtree. If the method looks for general IIU plans, the method will maintain the index-intersection set, and the factorized form that leads to the best IIU plan for the subtree. Once the method has identified these sets and factorized forms at the lowest OR nodes, the method looks at the AND nodes immediately above these OR nodes. (if there are no such AND nodes, it means there was only one OR node and the expression was in DNF. The solution is then available at the OR node.). At an AND node, the method attempts to synthesize the set of perfect factors and the best factored form for its subtree using the information maintained at its children. The set of perfect factors is obtained simply by unioning the sets of all its children.

Identifying the best factored form at an AND node can be harder than identifying the best factored form at an OR node. If only IIFU plans are desired, the method could be configured to just choose the IIFU factored form of one of the children and evaluate the rest of the conditions as a filter. Note that there is no direct way of combining one IIFU plan with any other plan that involves index-intersections in order to produce another IIFU plan. One situation where the method can do better is when multiple IIFU factored forms have the same factors. For example, AB+CD is an IIFU factored form. AB+EF is another. Note that these two forms can be combined at an AND node to produce (AB+CD)(AB+EF). This form is not an IIFU form though, since it would require performing an index intersection at the end. The method could choose to retain one of the two forms, (AB+CD) or (AB+EF), and evaluate the other as a filter. But, in this case, since AB is actually present in both factored forms, the method can simplify the product expression (AB+CD)(AB+EF) as AB+CDEF which is an IIFU factored form, since it can be evaluated by a series of index intersections followed by one index union. The method uses efficient algorithms to detect such common factors across the factored forms and considers generating IIFU forms in this fashion.

At an OR node, the best factored form for the subtree can be easily identified. The method simply combines IIFU factored forms of all the children to produce the IIFU form at the OR node, since the method is simply combining all the existing index-union operations into a single union. Identifying the set of perfect factors is achieved by treating each child as a conjunct of its set of perfect factors, and identifying the perfect factors of the consequent DNF expression. In the general case, the method can replace complex sub-expressions by new symbols so as to make the subtree's overall expression appear to be in DNF. The method then applies the standard factorization algorithm to the expression, taking care to suitably modify the cost functions to deal with complex subexpressions being factors. For example, if the two children of an OR node were (A+B)(CD+E) and (A+B)(EF+G), the method can logically replace A+B by X CD+E by Y, and EF+G by Z, treating the overall expression as a DNF expression XY+XZ. The method can then factorize this "DNF" expression into X(Y+Z) if the cost function determines that such a factorization is useful.

Condition Relaxation via Predicate Merging

In the embodiment disclosed above, exact factoring is performed to generate an efficient index intersection and union plan for a given selection condition. In one embodiment, the search space is expanded to generate better index intersection and union plans by relaxing the original condition. For example, an expression E may have the form XA+YB. The expression E'=(X+Y)(A+B) is a relaxation of the original expression E. This is easily verified by multiplying out the factors of E' to get the original expression XA+YB plus extra terms XB+YA that can easily be filtered out at the end. E' might be preferable to E if predicates X and Y overlap and enable more efficient evaluation of X+Y than evaluating X and Y individually: The factored expression E'=(X+Y)(A+B) can be used to find a relaxed set of record identifiers, which can then be filtered by an exact evaluation of the original expression E. As described above, there is a potential advantage when X and Y are identical (exact factoring). In one embodiment, the method explores the case where X and Y are not identical.

In the exemplary embodiment, the space of possible merges to consider is limited to predicates which, when merged, will yield another atomic predicate that can be evaluated by a single index scan. Examples of such predicates are single-dimensional range predicates. For example, $E_1$: (x IN [1,5])A+(x IN [2,6])B, where (x IN [1,5]) refers to an attribute x being in the range 1 to 5, (x IN [2,5]) refers to attribute x being in the range 2 to 6 and A, B refer to some other logic expressions. We can relax both predicates involving x to (x IN [1,6]) and factor it out to produce $E_2$: (x IN [1,6])(A+B). The record identifiers whose tuples do not satisfy $E_1$ need to be filtered out. But, the relaxation produces a benefit, in that, the predicate $E_2$ may be easier to evaluate than $E_1$.

Merging predicates as in the above example to enable better factorization is a tradeoff between reduced index-retrieval and index-intersection cost on the one hand and increased index-union cost on the other. In an expression of the form $R_1A+R_2B$ where the two predicates $R_1$ and $R_2$ intersect, $R_1$ and $R_2$ can be merged as a single predicate R. The expression can be rewritten as, R(A+B). This will reduce the index-retrieval cost of $R_1$ and $R_2$. However, the intermediate record identifiers of A+B and R might be individually quite large causing the record identifier hash-merge cost to increase. This tradeoff is quantified in the cost function described below. In the exemplary embodiment, the cost of extra data fetches due to relaxing an expression is not included, because it is expected that the exact condition will be evaluated on the final record identifier list by retaining the attribute values along with the record identifier list of each scan.

In the exemplary embodiment, both relaxed factoring and exact factoring are performed in the same framework. The only difference is that, instead of choosing the best factor amongst predicates repeated exactly, the method expands the set to include merges of overlapping predicates. It is noted that all the algorithms presented above, including those that work with arbitrary AND-OR expressions rather than DNF, generalize directly to accommodate the presence of merged predicates. This disclosure presents an algorithm that can be used to find the best merged predicate. Recall that in the exemplary embodiment, merges are limited to only those atomic predicates that can be merged to another atomic predicate. A unified framework is used to evaluate the quality of a factor, whether exact or approximate. Thus, in the exemplary embodiment a merged predicate is treated as a factor, whose quality can be evaluated in the same manner and in the same units as an exact factor. The gain formula used to determine the gain of an exact predicate is modified to include merged predicates.

Evaluating the Quality of a Merged Predicate $a_1, a_2 \ldots a_n$ may be atomic predicates along the same index whose merge is the atomic predicate a. In the exemplary embodiment, the method estimates the gain in factorizing the expression $a_1x_1+a_2x_2+ \ldots a_nx_n$ into $a(x_1+x_2+ \ldots x_n)$. $x_1, x_2, \ldots x_n$ could themselves be conjunctions of literals.

In one embodiment, the gain in factorizing the expression can then be estimated by the formula:

$$G = (k_1 + 1)\left(\sum_{i=1}^{n} l_{a_i} - l_a\right) - \sum_{i=1}^{n} (l_{x_i} - l_{ax_i}) \quad (3)$$

This formula reduces to disclosed gain formula (2) when all the $a_i$s are equal.

Algorithm for Choosing the Best Merged Predicate

The disclosed method selects the set of predicates to merge so as to maximize the gain from factorizing the expression. The space of possibilities the method considers has 2 degrees of freedom:

1. The method can choose the dimension along which predicates should be merged.

2. The method can choose which set of predicates to relax along the chosen dimension.

In one embodiment, the first degree of freedom can be handled by an exhaustive linear search. In this embodiment, the method identifies the best solution along each dimension and picks the best among these. There are an exponential number of possibilities associated with the second degree of freedom. In the exemplary embodiment, the exact predicates to relax are identified using the disclosed cost function, in polynomial time.

This algorithm can also be applied in cases where the merge of two atomic predicates results in an atomic predicate that covers the union of the two predicates. For example, in one embodiment when the method merges two multi-dimensional range predicates, the method may produce a single multi-dimensional predicate that might be larger than their union. For such merge operations, the disclosed algorithm is not guaranteed to produce the optimal solution. Identifying the optimal solution in such cases is likely to be NP-hard. In one embodiment, the disclosed algorithm guarantees optimality when the intersection operator distributes over the merge operator applied to these predicates.

The disclosed algorithm computes the set of predicates to be merged in an incremental fashion, while also maintaining the associated gain value G. The incremental computation of gain G is achieved by incrementally maintaining an auxiliary function F for all sets of predicates, and carefully choosing the initial values for these functions. The algorithm defines functions F and G, which are used as subroutines by Algorithm 3 BestMergedFactor(f) (defined below).

For all predicates a occurring in the original expression as a conjunction ax, define $F(a)=-l_x$. If a occurs as a stand-alone predicate, i.e., x is the predicate True, then $l_x$ is the number of tuples in the whole table.

If two overlapping predicates, $a_1$ and $a_2$ are being merged to form a new atomic predicate a, $F(a)=F(a_1)+F(a_2)+l_{a_1 \cap a_2}$ Define $G(a)=Max(F(a),0)$.

It is noted that the gain function G(a) is computed in the same fashion as the value computed by the Gain function G disclosed for merged predicates.

Algorithm 3, set forth below is one algorithm that may be used to select the best merged factor.

Figure 8:
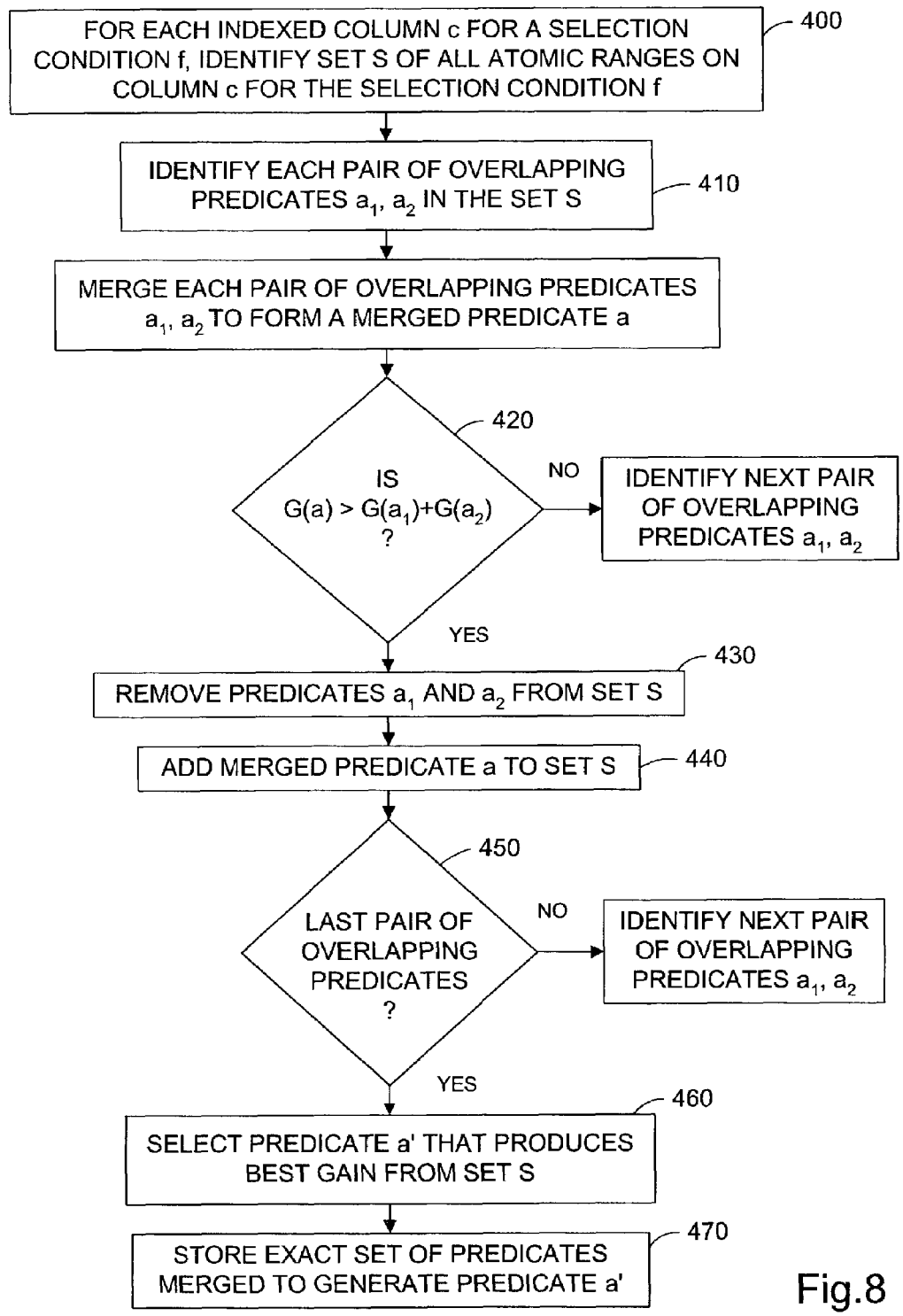
FIG. 8 is a flowchart representation of method steps used to practice an embodiment of the present invention.

Algorithm 3 SelectBestMergedFactor(f)
1: BestGain=0; CurrentAnswer={ };
2: for all indexed columns c in f do
3:   Let S=Set of all atomic ranges on Column c in f;
4:   while true do
5:     Select 2 overlapping predicates $a_1$ and $a_2$ from S, whose merge is a, such that $G(a)>G(a_1)+G(a_2)$;
6:     If no such $a_1$ and $a_2$ exist, break;
7:     Remove $a_1$ and $a_2$ from S;
8:     Add a to S;
9:   end while
10:   a'=Predicate in S such that for all p in S, $G(a') \geq G(p)$
11:   if G(a')>BestGain then
12:     BestGain=G(a');
13:     CurrentAnswer=Set of ranges merged to obtain a';
14:   end if
15: end for
16: return CurrentAnswer;

Referring to FIG. 8, Algorithm 3: SelectBestMergedFactor, starts out 400 with a set S of all atomic predicates on the same attributes. Set S may include all atomic ranges on each indexed column c specified by the selection condition. In the exemplary embodiment, the algorithm identifies 410 pairs overlapping predicates $a_1$ and $a_2$ in each of the sets S, whose merge is another atomic predicate a. The algorithm determines 420 whether the gain of a is greater than the sum of the gains of $a_1$ and $a_2$ $(G(a)>G(a_1)+G(a_2))$. If the gain of a is not greater than the sum of the gains of $a_1$ and $a_2$ then the next pair of overlapping predicates are evaluated. If the gain of a is greater than the sum of the gains of $a_1$ and $a_2$, then $a_1$ and $a_2$ are deleted 430 from the set and a is inserted 440 instead. The method continues this process as long as there are two predicates that can be merged in this fashion. When the algorithm determines 450 that there are no more predicates to merge, the algorithm selects 460 the best predicate a' in the set and returns it. The disclosed method also maintains 470 additional information to identify the exact set of predicates that were merged to generate a'. This information may be used to filter the results, so that only tuples that satisfy the original selection condition are returned. The method uses a "semi-naive" evaluation to perform merges efficiently. The complexity of identifying overlapping predicates is dependent on the form of overlap that the method is looking for, but the identification can be performed efficiently in many cases.

Combining Exact Factoring, Condition Relaxation and Index Selection

This section of the disclosure discusses how the results of exact factoring and approximate factoring are used to obtain an optimized access path for single-relation selection. In one embodiment disclosed above, the exact and approximate factoring algorithms assume that all predicates in the boolean expression will be evaluated via an index scan. This is not always the best strategy in the presence of atomic predicates that are not selective. Choosing the right set of indices for a given boolean expression is a component of a query optimizer. However, most query optimizers do not attempt any factoring of repeated predicates. Hence, this disclosure discusses how the new factoring algorithms integrate with the existing index-selection algorithms.

In one embodiment, the index selection is invoked either before or after the factorization steps. There is a need for an integrated approach, because either approach could be sub-optimal.

Index selection before factoring. Consider the expression AB+BC. A traditional optimizer might, based on the selectivity of the different predicates, choose the index on A for the AB disjunct and the index on B for the BC disjunct leaving the rest to be evaluated as a filter. If the indexed part of the expression A+B is submitted to the index intersection and union plan optimizer, the no common factor will be found. In contrast, if the factoring algorithm is invoked first and B(A+C) is found to be a gainful factor, the index selection step might choose an index scan on B followed by a filtered evaluation of A+C.

Index selection after factoring A factorization algorithm may be dependent on the index selection decision. In the above example, if A+C produces large intermediate record identifiers, the gain of factoring out B as a divisor might become negative. The formula for computing gain in Equation 2 above assumes that A+C is calculated via an index scan. Thus gain calculated as $G=(k_1+1)l_B-l_C+(l_{AB}+l_{BC})$ might result in a negative value when the result of A+C is very large. This might happen when B has very low value of selectivity (small size of $l_B$) and A and C have large selectivity values. One strategy here would have been to first do an index scan on B, fetch data pages and evaluate (A+C). But the factorization would not generate B as a factor to enable the method to choose this option in a post-processing step. As a result, the gain function might be negative precisely for those factors F whose quotient Q are good candidates for evaluating as a filter after data scan.

The decision to use an index for a predicate scan is both influenced by and influences the factoring decision. In the exemplary embodiment, the exact and relaxed condition algorithms are modified to provide an integrated solution to the problem.

In the exemplary embodiment, a subroutine, BestSelectionPlan, that when presented with a factorized expression finds the best access path after selecting the right subset of indices and exploits the factorization wherever possible. One such subroutine is disclosed by C. Mohan et al., Single table access using multiple indexes: optimization, execution, and concurrency control techniques, *Proc. International Conference on Extending Database Technology*, pp. 29–43, (1990). Any other similar algorithm could be used, provided the algorithm does not require normalizing the expression into a standard disjunctive normal form or a conjunctive normal form before starting the index selection phase. In the exemplary embodiment, this subroutine is recursively invoked.

In the exemplary embodiment, the gain function is corrected that assumes that each literal in an expression will be evaluated via an index scan. A gain function that does not assume each literal expression will be evaluated via an index selection is disclosed below.

The Modified Gain Function

Considering a divisor D that can factorize its parent expression f as DQ+R. In the exemplary embodiment, the gain G(D) is defined as the difference between the following two costs:

1: $c_1$: the cost of the best plan returned by a subroutine, BestSelectionPlan on f
2: $c_2$: the cost of the best plan returned by the subroutine BestSelectionPlan on DQ+R.

In this embodiment, the gain is defined as $G(D)=c_1-c_2$. If $G(D) \leq 0$, the method does not perform the factorization.

The Combined Algorithm

Algorithms 4 and 5 combines the exact and approximate factoring of expressions. In one embodiment, the selection of an optimized set of indexes by using the modified gain function that invokes the BestSelectionPlan subroutine.

Algorithm 4 GenerateBestFactoredPlan(f)
 1: p=GenerateBestFactoredForm(f);
 2: Plan P=BestSelectionPlan(p);
 3: if Flag APPROXIMATED=true then
 4: Add a filter to the top of the plan (before data access) with appropriate filter condition.
 5: end if Algorithm 5 GenerateBestFactoredForm(f)
 1: e=GetBestExactFactor(f); //using new definition of gain.
 2: m=GetBestMergedFactor(f);
 3: If both e and m have gain$\leq 0$, return f;
 4: If G(e)>G(m)
 5: //The exact factorization is more beneficial
 6: Factorize f as f=e.Q+R;
 7: q=GenerateBestFactoredForm(Q);
 8: r=GenerateBestFactoredForm(R);
 9: p=e.q+r;
 10: return p
 11: else
 12: //Approximate factorization is better
 13: Obtain f' from f by replacing all predicates belonging to S by m;
 14: Do the same steps 6–9, but with f' instead of f;
 15: Set Flag APPROXIMATED=true;
 16: //We eventually need to add a filter on top of the generated plan, to select only those tuples that satisfy f;
 17: return p;
 18: end if Referring to FIG. 9, algorithm 5 retrieves 510 the best exact factor e for the selection condition f and retrieves 515 the best merged factor m for the selection condition f. The best exact factor e may retrieved by Algorithm 1 and the best merged factor m may be retrieved by Algorithm 3. In the illustrated embodiment, the subroutine, BestSelectionPlan, provided by the optimizer is invoked during the computation of gain when selecting the best exact or merged factor. It should be readily apparent to those skilled in the art that any computation of gain could be employed. Algorithm 5 then determines 520 whether one of the merged factor m or the exact factor e would result in a gain. If neither the merged factor m nor the exact factor e would result in a gain, the algorithm returns 525 the selection condition being optimized. If the merged factor m or the exact factor e would result in a gain, the algorithm determines 530 which factor would result in a greater gain. If the algorithm determines that the exact factor would produce a greater gain, the selection condition f is factorized 535 using the exact factor e. The algorithm then returns the factorized selection condition. If the algorithm determines that the merged factor would produce a greater gain, the merged factor m is substituted 540 in the selection condition f for the predicates merged to form the merged factor m to create an altered selection condition f'. Algorithm 5 then factorizes 545 the altered selection condition f' and sets 550 a flag that indicates that a filter needs to be added to select only records that satisfy the selection condition f. A filter can always be moved above intersection and union nodes in a plan, so long as the filter condition is changed appropriately. The predicates that are used to form the merged predicates are used to form the filter in the exemplary embodiment. A sequence of two filters can be merged into one. The algorithm then returns the factorized selection condition f.

Algorithm 4 invokes algorithm 5 to generate a factored form of the selection condition. The selection plan P is retrieved by the subroutine BestSelectionPlan for the factorized selection plan returned by algorithm 5. If a merged factor was factored out of the selection condition, a filter condition is added to the top of the plan. The filter removes tuples that do not satisfy the original selection condition f, because predicates were replaced with a merged predicate.

Examples of Experimental Evaluation of Disclosed Algorithms

The following examples indicate that the algorithms improve performance for different query characteristics and the factoring algorithms are robust, i.e. optimization does not produce plans inferior to a plan generated by a traditional optimizer. A proof included in appendix A shows the optimality of the algorithm for merging predicates and justifies using literals as factors in the disclosed factoring algorithm.

In all these experiments, a version of the factorization algorithm that produces arbitrary index-intersection and union plans, working from a DNF expression, is used.

Experimental Setup

Synthetic workloads were generated to measure the improvement in query plans for various query characteristics using the disclosed algorithms. The experiments were carried out on a 1 GB TPCH database (with skew 1) on a commercial DBMS. A single table was used that was an extension of the line item table, extended by foreign-key joins. There were indexes present on 6 of the columns, many of which were key fields. All queries were capable of being evaluated solely from indexes.

In order to generate overlapping predicates, range predicates were used on different fields of the table. The queries were rewritten suitably in order to force the query optimizer to choose a certain execution plan.

The cost of each of the query plans was measured in two different ways—estimated execution time, and the actual execution time averaged over multiple runs of the query. The results presented below are on estimated execution times. Also, each of the data points shown in the graphs of FIGS. 10–13, corresponding to a particular setting of query characteristics, is averaged over 200 different queries generated with those characteristics.

Query Parameters

The following are query characteristics that were controlled:
  1. Query Structure: WHERE clauses were generated in DNF. So, query structure was determined by the total number of terms generated, and the distribution of the number of literals per term.
  2. Predicate Selectivities: The selectivities of the predicates in the query were chosen either from a Gaussian distribution, or from a uniform distribution with a certain peak value. The selectivities of predicates in the generated queries were controlled using the statistics maintained by the database system.

3. Repeating Predicate: In many of the experiments, only one predicate was made to repeat (either exactly or approximately) in order to isolate the effect of a single factorization. The selectivity of the repeating predicate and the number of repetitions were controllable.

4. "The Fudge Factor": This factor controlled the degree of overlap for the generation of overlapping predicates. If this factor is one, the overlapping predicates are identical. If the factor is zero, the overlap between the predicates is zero. Thus, the value of the fudge factor controls how much the overlapping factors intersect.

The outputs generated were as follows:

1. The cost of the original query plan generated by the query optimizer. Most often, the original plan was to perform a linear scan of the clustered index.
2. The cost of the index intersection and union-plan on the original DNF of the WHERE clause.
3. The cost of the index intersection and union-plan on the factored form of the WHERE clause.

The results on the performance improvement obtained for various query characteristics are presented below. Most of the graphs of FIGS. 10–13 approximately track the performance improvement as a function of one of the characteristics, while keeping the others constant.

The Selectivity of the Repeating Predicate

Figure 10:
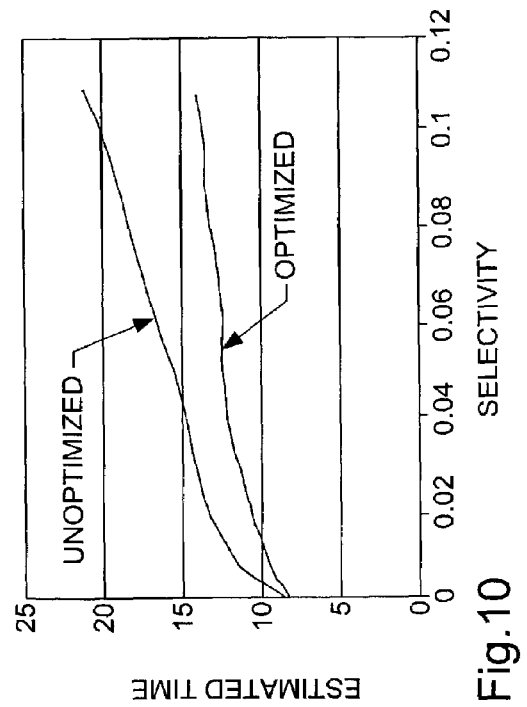

FIG. 10 shows the estimated execution times for a query whose WHERE clause had 6 terms with 2 literals/term. There was exactly one predicate that repeats, and it repeated exactly once. All the predicate selectivities were fixed at 0.01 except for the selectivity of the repeating predicate, which is varied from 0.01 to 0.1. The time savings became larger and larger as less selective predicates were factored out. There was nearly a 50% improvement in execution time when the repeating predicate selectivity is 0.1. Results for other predicate selectivity values and distributions are presented below.

Figure 11:
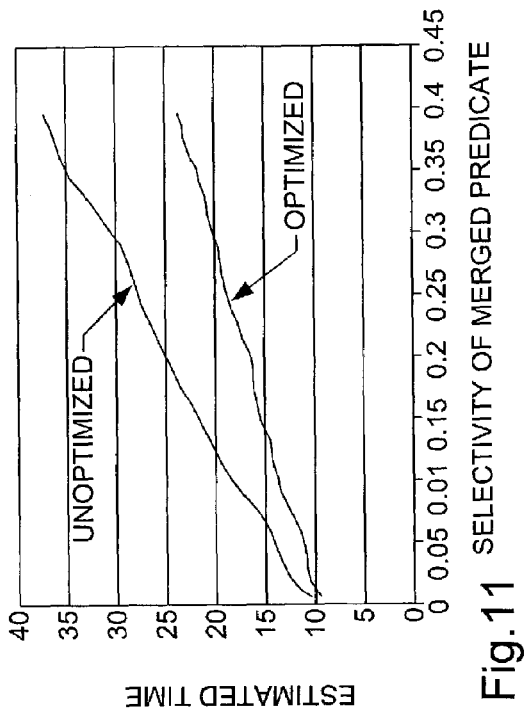
FIGS. 10–16 are graphs showing estimated execution times of unoptimized queries and queries optimized using the disclosed algorithms.

FIG. 11 shows the estimated times when a "fudge factor" of 0.5 was used to generate an "approximate" repeating predicate, and the selectivities of the rest of the predicates were set at 0.01. FIG. 11 shows that approximate factoring appears to produce nearly as good a time savings as exact factoring for this class of queries, and the payoff increases as the selectivity of the merged predicate increases.

The plan selected by the DBMS was a linear scan in all these cases and had a cost of around 144, which happens to be about 6 times the cost of the worst plan generated by the disclosed algorithms.

Figure 12:
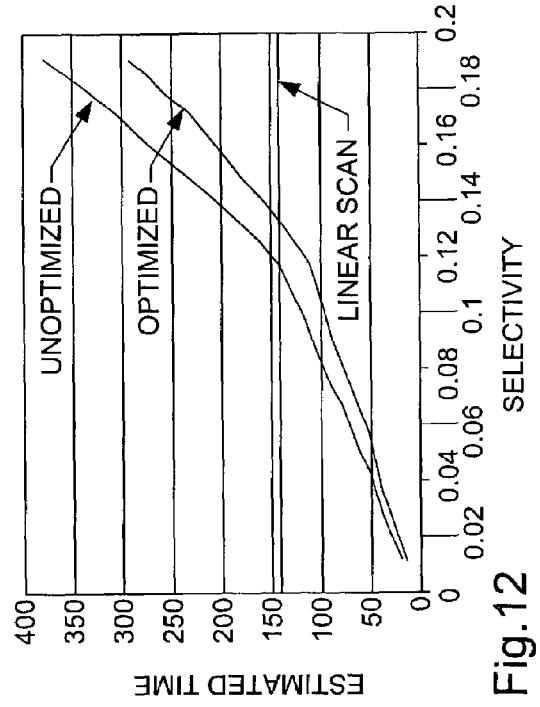

FIG. 12 shows the estimated execution times when all the selectivities are scaled together, i.e., the selectivity of the repeating predicate is made equal to that of the other predicates. Again, a consistent improvement in performance is realized, as in FIG. 11.

Figure 13:
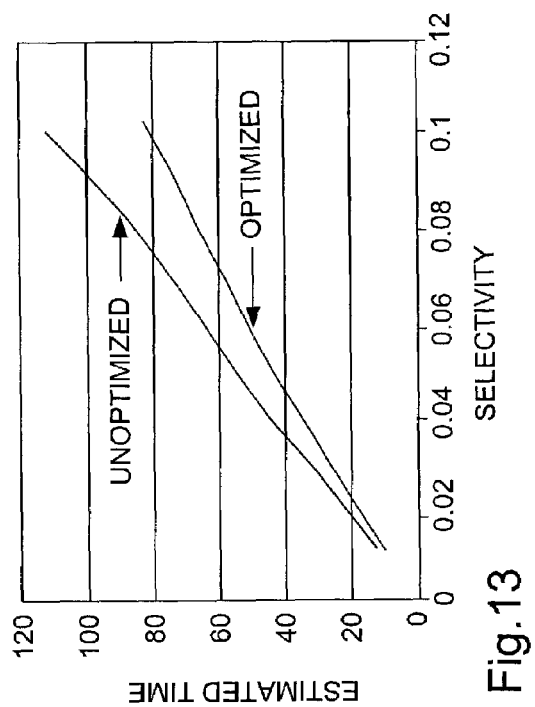

FIG. 13 repeats the same experiment, but with a fudge factor of 0.5, and with the selectivity of the merged predicate being made identical to the selectivity of the rest of the predicates. Again, a considerable improvement in performance using approximate factoring is realized.

Sensitivity to Number of Repetitions

Figure 14:
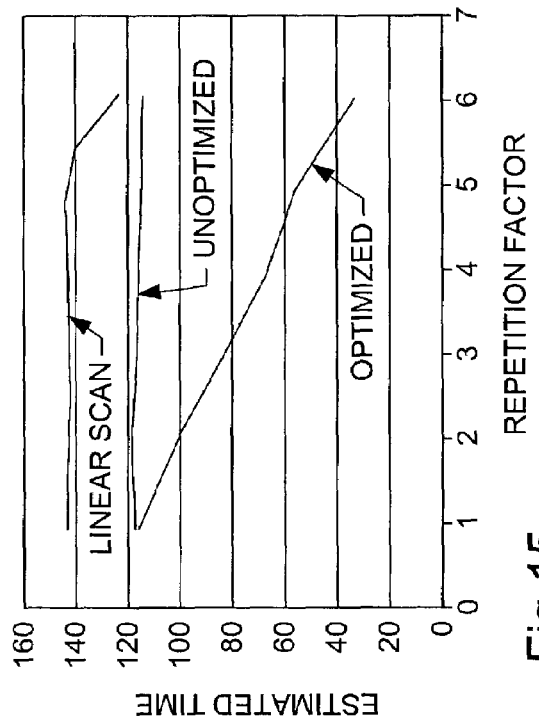

For the same query structure (6 terms, 2 literals/term), FIG. 14 shows the sensitivity to the number of repetitions of a predicate in the query when all predicate selectivities are set at 0.01. There is an almost super-linear improvement in performance with an increase in the repetition factor.

Figure 15:
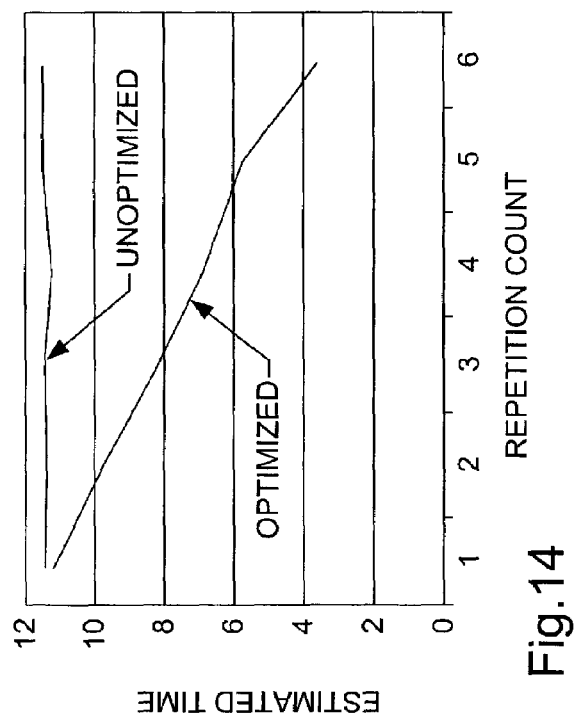

FIG. 15 plots the same graph, but this time with all selectivities set to 0.1. FIG. 15 shows that the improvement is not confined to queries with highly selective predicates but is as marked even when we have unselective predicates.

Sensitivity to the "Fudge Factor"

Figure 16:
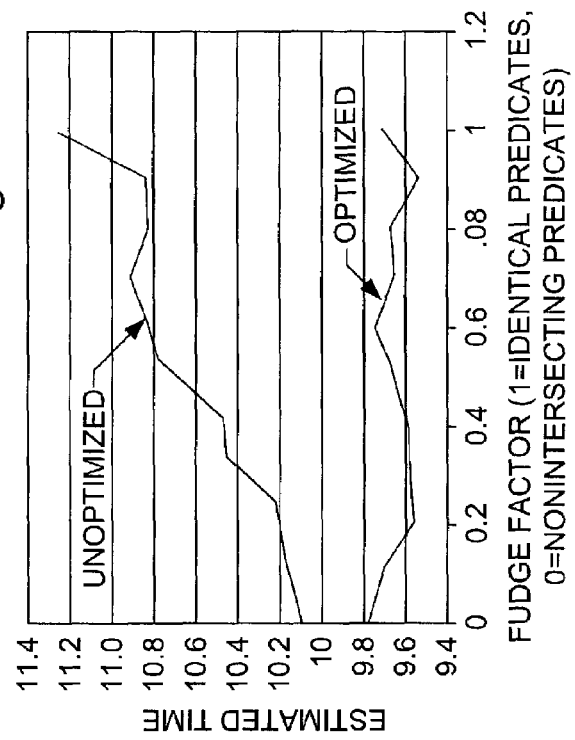

FIG. 16 shows the sensitivity to the fudge factor used in generating approximately similar factors. As noted earlier, a fudge factor of 0 means that there is absolutely no intersection between predicates, while a fudge factor of 1 implies that all the repeated predicates are identical. FIG. 16 shows the effect of the fudge factor, with all predicates being of selectivity 0.01, and with two intersecting predicates whose union also has selectivity 0.01.

FIG. 16 shows that the greater the intersection between the predicates (for the same size of the union of the predicates), the greater the improvement from factoring. The improvement varies from 3% with a "fudge factor" of 0 to 15% with a "fudge factor" $1$, which is pretty considerable for just one approximately repeating predicate whose selectivity is less than that of all other predicates in the expression.

Robustness Evaluation

Extensive experiments were conducted to evaluate the robustness of factoring, i.e., to check whether factoring provides non-zero improvement irrespective of the query characteristics, and to check whether the disclosed factoring algorithms ever make things worse.

The set of query characteristics that were varied include:
1. selectivity of the non-factored predicates,
2. distribution function used for getting the selectivities of the different predicates (Uniform and standard deviation),
3. standard deviation of the Gaussian distribution,
4. number of literals,
5. selectivity of the merged predicate when doing condition relaxation For each of these parameters both the actual and estimated execution time for the factored (both exact and relaxed), unfactored and linear scan options were measured. The exercise established beyond doubt the robustness of the disclosed optimizations. FIGS. 10–16 present a reasonable sample of experiments that use the disclosed algorithms. These graphs establish that there are large classes of queries where the disclosed optimized query plans outperform the query optimizer's plans. In nearly all cases, the optimized plans were seen to be at least as good as the conventionally-generated plans, thus establishing the robustness of the disclosed techniques. In addition, and optimality proofs are disclosed below that prove robustness.

This disclosure addressed the problem of optimizing queries with complex selection conditions. The disclosed exact factoring and condition relaxation techniques transform expressions into simpler forms. This application discloses an efficient factorization algorithm. The algorithm is extended to factor in merged predicates obtained by relaxing two or more atomic predicates. A method for integrating these transforms with existing query optimizers' support for selecting indexes is disclosed.

The experiments on a commercial database system establish that factorization can provide a considerable improvement over DNF for a large class of query characteristics. These experiments demonstrate some of the classes of queries where improvement is visible. The disclosed algorithms are robust and are more efficient than the normal index intersection and union strategy for nearly all queries.

Although the present invention has been described with a degree of particularity, it is the intent that the invention include all modifications and alterations falling within the spirit or scope of the appended claims.

Appendix A—Proof of Optimality of Approximate-Factoring Algorithm

The approximate factoring algorithm is optimal so long as the overlap/intersection operator distributes over the merge operator, operating on atomic predicates. For example, single-dimensional range predicates satisfy this property. For simplicity, this proof assumes that the predicates to be merged are single-dimensional range predicates, with the understanding that the same proof holds for other types of overlap.

Functions F and G on atomic predicates are defined above. This proof now defines F and G for sets of predicates to be the corresponding function evaluated on the merge of all elements of the set.

Formally, for any atomic predicate R occurring in the original expression as a conjunction Rx:

$$F(\{R\}) = -l_x$$

For any two overlapping predicates $R_1$ and $R_2$, with corresponding sets of predicates $S_1$ and $S_2$, whose merge is R:

$$F(S_1 \cup S_2) = F(S_1) + F(S_2) + (k_1+1)l_{R_1 \cap R_2}$$

The above formula also holds when $R_1$ and $R_2$ do not intersect.

This proof also defines, for any set of predicates S, $G(S) = \max(F(S), 0)$.

At the end of Algorithm X+3, there is a partition of all the range predicates on a particular column. Let us call the sets in this partition $S_1, S_2, S_3, \ldots$. Without loss of generality, let $$\forall_i G(S_1) \geq G(S_i).$$

The algorithm then produces $S_1$ as its output.

In general, a "solution" is just a set of range predicates, all of which are to be merged together. The gain for unions of disjoint solutions is defined here as the sum of the gains of the individual solutions. The union of multiple disjoint solutions can be unambiguously represented by a single set, because there is only one way of partitioning a set into disjoint solutions.

Lemma 1 If S is the solution generated as the output of Algorithm 3, G(S)>G(S') for any S\$ that is a subset of S.

Proof This lemma is proved by induction on the number of merges performed to generate the final, merged range corresponding to S. Call this final range R. First, if R is obtained by merging two atomic predicates $R_1$ and $R_2$ from the original expression, it is known, as a result of the conditions of the algorithm, that: $G(R) > G(R_1) + G(R_2)$ In this case, $S = \{R_1, R_2\}$ and, therefore, the gain corresponding to any subset of S is clearly less than G(R).

Now, let R be obtained by merging an atomic range $R_1$ with a merged range $R_2$. If S' contains the atomic range $R_1$, it is known that $S' - \{R_1\} \subset S - \{R_1\}$ and, by induction, $G(S' - \{R_1\}) > G(S - \{R_1\})$ and, consequently, the same inequality holds when we replace G by F. It is known that $$G(S) = F(S - \{R_1\}) + F(R_1) + (k_1+1)l_{R_1 \cap R_2}$$

$$G(S) > F(S' - \{R_1\}) + F(R_1) + (k_1+1)l_{R_1 \cap R_2}$$

$$G(S) > F(S')$$

If S' does not contain $R_1$, then $S' \subseteq S - \{R_1\}$ and, therefore, $G(S - \{R_1\}) \geq G(S')$. Also, since Algorithm 3 merged $R_1$ and $R_2$, it is known that $$G(S) > G(S - \{R_1\}) + G(R_1)$$

$$G(S) > G(S') + G(R_1)$$

$$G(S) > G(S')$$

This proves that if R is obtained by merging an atomic predicate $R_1$ from the original expression, with a merged predicate $R_2$, G(S) is greater than the gain for any subset of S.

Now, let R be obtained by merging two merged predicates $R_1$ and $R_2$, with corresponding sets of predicates $S_1$ and $S_2$. Let $S_1' = S_1 \cap S'$ and $S_2' = S_2 \cap S'$ Without loss of generality, assume that $S_1' \subset S_1$ Then, $S_2' \subseteq S_2$. It is then known that $$F(S) = F(S_1) + F(S_2) + (k_1+1)l_{R_1 \cap R_2}$$

$$F(S) = F(S_1') + F(S_2') + (k_1+1)l_{R_1 \cap R_2} \text{ (by induction assumption)}$$

$$F(S) = F(S')$$

This concludes the proof.

Lemma 2 If S is the output generated by Algorithm 3, and S' is the optimal solution, every pair of predicates in S' are merged together into the same partition at some point in the execution of Algorithm 3 and are consequently in S.

Proof This statement is proved by induction on the number of predicates in S'. As the base case, let the number of predicates in S' be 2, and call the predicates $R_1$ and $R_2$. Suppose $R_1$ and $R_2$ are not merged by the algorithm. Then, by the algorithm's decision not to merge $R_1$ and $R_2$, it is known that $G(S') <= G(R_1) + G(R_2) = 0$. Therefore, solution S' is sub-optimal compared to S.

Now, let the partitions generated by Algorithm be $S_1, S_2, \ldots$ with $S = S_1$. If, for all intersecting predicates $R_1$ and $R_2$ in S', $R_1$ and $R_2$ both belong to the same partition, it can be seen that S' is, itself, equal to $S_i$ for some i. (Since, according to the disclosed cost function, it is never profitable to merge two predicates that don't have an intersection, the "intersection graph" of the predicates in S' needs to be connected.) If S' is equal to $S_i$, then, by the algorithm, $G(S_1) \geq G(S_i)$ and, therefore, $G(S) \geq G(S')$.

Therefore, let there be some two intersecting predicates $R_1$ and $R_2$ in S' which belong to different partitions generated by the algorithm, say $S_i$ and $S_j$, with corresponding merged predicates $R_i$ and $R_j$. If S $|S_i|>1\$$ and $|S_j|>1$, then $F(S_i \cup S_j) = F(S_i) + F(S_j) + (k_1+1)l_{R_i \cap R_j}$. We know that $F(S_i) = G(S)$ and $F(S_j) = G(S_j)$, and $l_{R_i \cap R_j}$ is non-zero, since $R_1 \cap R_2$ is non-empty. Therefore, $G(S_i \cup S_j) > G(S_i) + G(S_j)$, which implies that the algorithm would have merged $S_i$ and $S_j$.

Therefore, at least one of $S_i$ and $S_j$ has cardinality 1. Without loss of generality let $S_i$ be a singleton with the atomic range $R_i$. By the induction assumption, $S_j$ is exactly equal to $S' - \{R_i\}$. Since the algorithm did not merge $S_i$ and $S_j$, it is known that $$G(S') \leq G(S_i) + G(S_j)$$

$$G(S') = G(S_j)$$

$$G(S') \leq G(S)$$

This completes the induction step.

Theorem 3 Algorithm 3 generates the optimal set of predicates to be merged.

Proof It is observed that G(S) accurately captures the utility of approximating all the factors in the set S. Together with this observation, Lemmas 1 and 2 directly imply that Algorithm 3 produces the optimal solution.

The invention claimed is:

1. In a relational database having records stored on a medium, a computer-implemented method of optimizing processing of a query with a record selection condition that includes a number of predicates, comprising:
   a) identifying one or more candidate predicates of the selection condition that can be used to factorize the selection condition;
   b) computing a gain from using a candidate predicate to factorize the selection condition;
   c) factorizing a candidate predicate that results in a positive gain from said selection condition to produce a rewritten selection condition; and
   d) processing said query with said rewritten selection condition.

2. The method of claim 1 wherein a greedy approach is used to select a candidate predicate for factorizing that results in the greatest gain.

3. The method of claim 1 wherein a subset of disjuncts of the selection condition are compared to identify common factors of the subset and a gain is computed for using a common factor of the subset to factorize the subset.

4. The method of claim 3 wherein all possible subsets are compared and gain is computed for each possible subset.

5. The method of claim 1 wherein a subtree of an OR node is factorized when said selection condition is in a form other than disjunctive normal form.

6. The method of claim 1 wherein a subtree of an AND node is factorized when said selection condition is in a form other than disjunctive normal form.

7. The method of claim 1 wherein the gain is set equal to zero when factorizing the selection condition with the candidate predicate produces a remainder.

8. The method of claim 1 wherein all perfect divisors of the selection condition are factorized to produce a rewritten selection condition.

9. The method of claim 1 further comprising generating a plan for processing the query that comprises one index lookup followed by a filter.

10. The method of claim 1 further comprising generating a plan for processing the query that comprises one index lookup followed by a data lookup and a filter.

11. The method of claim 1 further comprising generating a plan for processing the query that comprises a sequence of index intersections followed by a filter.

12. The method of claim 1 further comprising generating a plan for processing the query that comprises a sequence of index intersections followed by a data lookup and a filter.

13. The method of claim 1 further comprising generating a plan for processing the query that comprises a sequence of index intersections, followed by one or more index unions, followed by a filter.

14. The method of claim 1 further comprising generating a plan for processing the query that comprises a sequence of index intersections, followed by one or more index unions, followed by a data lookup and a filter.

15. The method of claim 1 further comprising generating a plan for processing the query that comprises an arbitrary sequence of index intersections, index unions and data lookups.

16. The method of claim 1 wherein said selection condition is converted to disjunctive normal form.

17. The method of claim 1 wherein an original form of said selection condition is in a form other than disjunctive normal form and the original selection condition is factorized and processed.

18. The method of claim 1 wherein the one or more candidate predicates are predicates that act on an indexed attribute.

19. The method of claim 1 wherein the gain computed is the cost savings obtained by reducing a number index accesses for the candidate predicate, added to the cost savings from reducing the number of index intersections as a result of factorizing the candidate predicate, reduced by the cost increase from increased index-union costs that result from factorizing the candidate predicate.

20. The method of claim 1 wherein gain is computed as a cost of executing a first selection plan for the record selection condition reduced by a cost of executing a second selection plan for the rewritten selection condition.

21. The method of claim 1 wherein indexes are selected after said factorizing.

22. The method of claim 1 further comprising computing a gain for all predicates that are literal divisors of the selection condition and identifying a predicate that produces the largest gain.

23. The method of claim 1 further comprising identifying a predicate of the rewritten selection condition that produces a gain and factorizing predicate that is identified from said rewritten selection condition before processing said query.

24. The method of claim 1 wherein said one or more candidate predicates are exact factors of said selection condition.

25. The method of claim 1 wherein said one or more candidate predicates are merged predicates produced by the union of two overlapping predicates of the selection condition.

26. The method of claim 25 further comprising filtering out results of the rewritten selection condition that do not satisfy the original selection condition.

27. In a database having records stored on a medium, a computer-implemented method of optimizing processing of a query with a record selection condition that includes a number of predicates, comprising:
   a) identifying one or more merged predicates produced by the union of overlapping predicates of the selection condition that can be used to factorize the selection condition;
   b) computing a gain from using a candidate merged predicate to factorize the selection condition;
   c) substituting the merged predicate that results in a positive gain for overlapping predicates used to produce the merged predicate being substituted;
   d) factorizing the merged predicate substituted for overlapping predicates from said selection condition to produce a rewritten selection condition; and
   e) processing said query with said rewritten selection condition.

28. The method of claim 27 wherein the one or more candidate merged predicates are predicates that act on an indexed attribute.

29. The method of claim 27 wherein the gain computed is the cost savings obtained by reducing a number of index accesses, added to the cost savings from reducing the number of index intersections, reduced by the cost increase from increased index-union costs that result from factorizing the merged predicate.

30. The method of claim 27 further comprising identifying a merged predicate of the rewritten selection condition that produces a gain and factorizing the identified predicate from said rewritten selection condition before processing said query.

31. The method of claim 27 further comprising filtering out results of the rewritten selection condition that do not satisfy the original selection condition.

32. In a database having records stored on a medium, a computer-implemented method of optimizing processing of a query with a record selection condition that includes a number of predicates, comprising:
 a) identifying a set of predicates on a given attribute;
 b) identifying overlapping predicates in the set;
 c) producing merged predicates by the union of overlapping predicates in the set;
 d) identifying one or more merged predicate that produce a greater gain than the overlapping predicates used to form the candidate merged predicates;
 e) adding the one or more candidate merged predicates to said set of predicates;
 f) selecting a predicate from said set that produces the greatest gain;
 g) factorizing the predicate selected from the set from said selection condition to produce a rewritten selection condition; and
 h) processing said query with said rewritten selection condition.

33. The method of claim 32 wherein the given attribute is an indexed attribute.

34. The method of claim 32 wherein the gain computed is the cost savings obtained by reducing a number index accesses, added to the cost savings from reducing the number of index intersections, reduced by the cost increase from increased index-union costs.

35. The method of claim 32 further comprising filtering out results of the rewritten selection condition that do not satisfy the original selection condition.

36. The method of claim 32 wherein a subset of disjuncts of the selection condition are compared to identify common exact or merged factors of the subset and a gain is computed for using a common factor of the subset to factorize the subset.

37. The method of claim 36 wherein all possible subsets are compared and gain is computed for each possible subset.

38. The method of claim 32 wherein a subtree of an OR node is factorized when said selection condition is in a form other than disjunctive normal form.

39. The method of claim 32 wherein a subtree of an AND node is factorized when said selection condition is in a form other than disjunctive normal form.

40. The method of claim 32 wherein the gain is set equal to zero when factorizing the selection condition with the candidate predicate produces a remainder.

41. The method of claim 32 wherein all perfect divisors of the selection condition are factorized to produce a rewritten selection condition.

42. The method of claim 32 further comprising generating a plan for processing the query that comprises one index lookup followed by a filter.

43. The method of claim 32 further comprising generating a plan for processing the query that comprises one index lookup followed by a data lookup and a filter.

44. The method of claim 32 further comprising generating a plan for processing the query that comprises a sequence of index intersections followed by a filter.

45. The method of claim 32 further comprising generating a plan for processing the query that comprises a sequence of index intersections followed by a data lookup and a filter.

46. The method of claim 32 further comprising generating a plan for processing the query that comprises a sequence of index intersections, followed by one or more index unions, followed by a filter.

47. The method of claim 32 further comprising generating a plan for processing the query that comprises a sequence of index intersections, followed by one or more index unions, followed by a data lookup and a filter.

48. The method of claim 32 further comprising generating a plan for processing the query that comprises an arbitrary sequence of index intersections, index unions and data lookups.

49. The method of claim 32 wherein said selection condition is converted to disjunctive normal form.

50. The method of claim 32 wherein an original form of said selection condition is in a form other than disjunctive normal form and the original selection condition is factorized and processed.

51. In a database having records stored on a medium, a computer-implemented method of optimizing processing of a query with a selection condition that includes a number of predicates, comprising:
 a) identifying an exact factor predicate that is an exact factor of the selection condition and produces a gain when used to factorize the selection condition;
 b) identifying a merged predicate produced by the union of overlapping predicates of the selection condition that produces a gain when used to factorize the selection condition;
 c) determining which of the exact factor predicate and the merged predicate produces a greater gain when used to factorize the selection condition;
 d) factorizing the exact factor predicate from said selection condition to produce a rewritten selection condition when said exact factor predicate produces said greater gain;
 e) factorizing the merged predicate from said selection condition to produce a rewritten selection condition when said merged predicate produces said greater gain; and
 f) processing said query with said rewritten selection condition.

52. The method of claim 51 wherein the exact factor predicate that results in the most gain is used to factorize the selection condition is identified.

53. The method of claim 51 wherein the merged predicate that results in the most gain when used to factorize the selection condition is identified.

54. The method of claim 51 wherein the exact factor predicate acts on an indexed attribute.

55. The method of claim 51 wherein the overlapping predicates used to produce the merged predicate act on a single attribute.

56. The method of claim 51 further comprising filtering out results of the rewritten selection condition that do not satisfy the original selection condition when the selection condition is rewritten by factorizing said merged predicate.

57. The method of claim 51 wherein gain is computed as a cost of executing a first selection plan for the record selection condition reduced by a cost of executing a second selection plan for the rewritten selection condition.

58. A computer readable medium having computer executable instructions stored thereon for performing a method of optimizing processing of a query with a selection condition that includes a number of predicates, the method comprising:
 a) identifying one or more candidate predicates of the selection condition that can be used to factorize the selection condition;
 b) computing a gain from using a candidate predicate to factorize the selection condition;
 c) factorizing a candidate predicate that results in a positive gain from said selection condition to produce a rewritten selection condition; and
 d) processing said query with said rewritten selection condition.

59. The computer readable medium of claim 58 wherein a greedy approach is used to select a candidate predicate for factorizing that results in the greatest gain.

60. The computer readable medium of claim 58 wherein a subset of disjuncts of the selection condition are compared to identify common factors of the subset and a gain is computed for using a common factor of the subset to factorize the subset.

61. The computer readable medium of claim 60 wherein all possible subsets are compared and gain is computed for each possible subset.

62. The computer readable medium of claim 58 wherein all perfect divisors of the selection condition are factorized to produce a rewritten selection condition.

63. The computer readable medium of claim 58 wherein the one or more candidate predicates are predicates that act on an indexed attribute.

64. The computer readable medium of claim 58 wherein the gain computed is the cost savings obtained by reducing a number index accesses for the candidate predicate, added to the cost savings from reducing the number of index intersections as a result of factorizing the candidate predicate, reduced by the cost increase from increased index-union costs that result from factorizing the candidate predicate.

65. The computer readable medium of claim 58 further comprising computing a gain for all predicates that are literal divisors of the selection condition and identifying a predicate that produces the largest gain.

66. The computer readable medium of claim 58 further comprising identifying a predicate of the rewritten selection condition that produces a gain and factorizing the predicate that is identified from said rewritten selection condition before processing said query.

67. The computer readable medium of claim 58 wherein said one or more candidate predicates are exact factors of said selection condition.

68. The computer readable medium of claim 58 wherein said one or more candidate predicates are merged predicates produced by the union of two overlapping predicates of the selection condition.

69. The computer readable medium of claim 58 further comprising filtering out results of the rewritten selection condition that do not satisfy the original selection condition.

70. A computer readable medium having computer executable instructions stored thereon for performing a method of optimizing processing of a query with a selection condition that includes a number of predicates, the method comprising:
  a) identifying one or more merged predicates produced by the union of overlapping predicates of the selection condition that can be used to factorize the selection condition;
  b) computing a gain from using a candidate merged predicate to factorize the selection condition;
  c) substituting the a merged predicate that results in a positive gain for overlapping predicates used to produce the merged predicate being substituted;
  d) factorizing the merged predicate substituted for overlapping predicates from said selection condition to produce a rewritten selection condition; and
  e) processing said query with said rewritten selection condition.

71. The computer readable medium of claim 70 wherein the gain computed is the cost savings obtained by reducing a number index accesses, added to the cost savings from reducing the number of index intersections, reduced by the cost increase from increased index-union costs that result from factorizing the merged predicate.

72. A computer readable medium having computer executable instructions stored thereon for performing a method of optimizing processing of a query with a selection condition that includes a number of predicates, the method comprising:
  a) identifying a set of predicates on a given attribute;
  b) identifying overlapping predicates in the set;
  c) producing merged predicates by the union of overlapping predicates in the set;
  d) identifying one or more merged predicate that produce a greater gain than the overlapping predicates used to form the candidate merged predicates;
  e) adding the one or more candidate merged predicates to said set of predicates;
  f) selecting a predicate from said set that produces the greatest gain;
  g) factorizing the predicate selected from the set from said selection condition to produce a rewritten selection condition; and
  h) processing said query with said rewritten selection condition.

73. The computer readable medium of claim 72 wherein the gain computed is the cost savings obtained by reducing a number index accesses, added to the cost savings from reducing the number of index intersections, reduced by the cost increase from increased index-union costs.

74. A computer readable medium having computer executable instructions stored thereon for performing a method of optimizing processing of a query with a selection condition that includes a number of predicates, the method comprising:
  a) identifying an exact factor predicate that is an exact factor of the selection condition and produces a gain when used to factorize the selection condition;
  b) identifying a merged predicate produced by the union of overlapping predicates of the selection condition that produces a gain when used to factorize the selection condition;
  c) determining which of the exact factor predicate and the merged predicate produces a greater gain when used to factorize the selection condition;
  d) factorizing the exact factor predicate from said selection condition to produce a rewritten selection condition when said exact factor predicate produces said greater gain;
  e) factorizing the merged predicate from said selection condition to produce a rewritten selection condition when said merged predicate produces said greater gain; and
  f) processing said query with said rewritten selection condition.

75. The computer readable medium of claim 74 further comprising filtering out results of the rewritten selection condition that do not satisfy the original selection condition when the selection condition is rewritten by factorizing said merged predicate.

* * * * *